(12) United States Patent
Si

(10) Patent No.: US 11,576,214 B2
(45) Date of Patent: Feb. 7, 2023

(54) METHOD AND APPARATUS FOR ENHANCED PRACH PREAMBLE

(71) Applicant: Samsung Electronics Co., Ltd., Suwon-si (KR)

(72) Inventor: Hongbo Si, Plano, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 37 days.

(21) Appl. No.: 17/249,554

(22) Filed: Mar. 4, 2021

(65) Prior Publication Data

US 2021/0307074 A1    Sep. 30, 2021

Related U.S. Application Data

(60) Provisional application No. 63/004,169, filed on Apr. 2, 2020, provisional application No. 62/994,511, filed on Mar. 25, 2020.

(51) Int. Cl.
*H04W 74/08* (2009.01)
*H04L 27/26* (2006.01)

(52) U.S. Cl.
CPC ..... *H04W 74/0833* (2013.01); *H04L 27/2605* (2013.01)

(58) Field of Classification Search
None
See application file for complete search history.

(56) References Cited

U.S. PATENT DOCUMENTS

| 10,367,620 | B2 * | 7/2019 | Iyer | H04L 1/1861 |
| 10,624,136 | B2 * | 4/2020 | Ko | H04W 74/006 |
| 10,798,751 | B2 * | 10/2020 | Ko | H04W 74/008 |
| 10,856,239 | B2 * | 12/2020 | Jeon | H04W 52/36 |
| 10,868,653 | B2 * | 12/2020 | Iyer | H04L 5/0007 |
| 11,039,478 | B2 * | 6/2021 | Kwak | H04W 74/006 |
| 11,219,062 | B2 * | 1/2022 | Jeon | H04B 7/0695 |
| 11,224,086 | B2 * | 1/2022 | Lee | H04W 76/19 |
| 11,234,136 | B2 * | 1/2022 | Li | H04L 27/26025 |
| 11,246,157 | B2 * | 2/2022 | Kim | H04L 5/0007 |
| 11,272,532 | B2 * | 3/2022 | Jeon | H04L 5/0053 |
| 11,310,715 | B2 * | 4/2022 | Kim | H04W 74/0833 |

(Continued)

FOREIGN PATENT DOCUMENTS

KR    20190138814 A    12/2019

OTHER PUBLICATIONS

"5G; NR; Physical channelsand modulation (3GPP TS 38.211 version 15.7.0 Release 15)", ETSI TS 138 211 V15.7.0, Oct. 2019, 100 pages.

(Continued)

*Primary Examiner* — Faiyazkhan Ghafoerkhan

(57) ABSTRACT

Methods and apparatuses for an enhanced physical random access channel (PRACH) preamble. A method of a user equipment (UE) in a wireless communication system includes receiving a set of higher layer parameters over a downlink channel and determining, from the set of higher layer parameters, a numerology for a PRACH preamble. The numerology includes an extended cyclic prefix (CP) length. The method further includes determining, from the set of higher layer parameters, a PRACH preamble format that is based on orthogonal frequency division multiplexing (OFDM) symbols with the extended CP length.

17 Claims, 10 Drawing Sheets

(56) References Cited

U.S. PATENT DOCUMENTS

| | | | | |
|---|---|---|---|---|
| 11,337,205 | B2* | 5/2022 | Lin | H04L 5/0007 |
| 2011/0039499 | A1* | 2/2011 | Zhang | H04W 74/0833 |
| | | | | 455/67.11 |
| 2014/0214329 | A1* | 7/2014 | Hilser | G16B 20/00 |
| | | | | 702/19 |
| 2014/0233528 | A1* | 8/2014 | Webb | H04L 5/0094 |
| | | | | 370/330 |
| 2015/0256206 | A1* | 9/2015 | Nakagata | H04L 1/0047 |
| | | | | 714/759 |
| 2015/0365977 | A1* | 12/2015 | Tabet | H05K 999/99 |
| | | | | 370/330 |
| 2016/0150570 | A1* | 5/2016 | Wang | H04W 4/70 |
| | | | | 370/329 |
| 2016/0237445 | A1* | 8/2016 | Li | C12N 15/8279 |
| 2016/0337988 | A1* | 11/2016 | Nan | H04W 74/08 |
| 2017/0019931 | A1* | 1/2017 | Su | H04L 43/16 |
| 2017/0019932 | A1* | 1/2017 | Su | H04W 74/0833 |
| 2017/0366311 | A1* | 12/2017 | Iyer | H04L 5/0007 |
| 2018/0049169 | A1* | 2/2018 | Lin | H04L 27/2602 |
| 2018/0124830 | A1* | 5/2018 | Lin | H04W 74/085 |
| 2018/0139082 | A1* | 5/2018 | Chen | H04L 27/2646 |
| 2018/0206271 | A1* | 7/2018 | Chatterjee | H04L 5/0053 |
| 2019/0074922 | A1* | 3/2019 | Lee | H04W 74/004 |
| 2019/0223223 | A1* | 7/2019 | Ko | H04L 5/0053 |
| 2019/0223228 | A1* | 7/2019 | Ko | H04W 74/0833 |
| 2019/0281624 | A1* | 9/2019 | Kim | H04L 27/2692 |
| 2019/0281635 | A1* | 9/2019 | Kwak | H04W 74/006 |
| 2019/0288809 | A1* | 9/2019 | Iyer | H04L 1/1893 |
| 2019/0387550 | A1* | 12/2019 | Pan | H04W 74/0833 |
| 2020/0045745 | A1* | 2/2020 | Cirik | H04B 7/0695 |
| 2020/0053779 | A1* | 2/2020 | Jeon | H04B 7/0695 |
| 2020/0068625 | A1* | 2/2020 | Zhang | H04W 74/0833 |
| 2020/0107277 | A1* | 4/2020 | Jeon | H04W 52/228 |
| 2020/0146054 | A1* | 5/2020 | Jeon | H04L 5/0053 |
| 2020/0154377 | A1* | 5/2020 | Qian | H04L 5/0048 |
| 2020/0221506 | A1* | 7/2020 | Jeon | H04W 74/0833 |
| 2020/0221510 | A1* | 7/2020 | Ko | H04W 74/08 |
| 2020/0267796 | A1* | 8/2020 | Lee | H04W 74/0833 |
| 2020/0275340 | A1* | 8/2020 | Kim | H04W 80/02 |
| 2020/0314917 | A1* | 10/2020 | Jeon | H04W 74/08 |
| 2020/0367288 | A1* | 11/2020 | Dahlman | H04W 74/0833 |
| 2021/0014694 | A1* | 1/2021 | Li | H04L 27/2607 |
| 2021/0037509 | A1* | 2/2021 | Lin | H04L 5/0007 |
| 2021/0051672 | A1* | 2/2021 | Rastegardoost | H04W 72/0493 |
| 2021/0051707 | A1* | 2/2021 | Rastegardoost | H04B 17/318 |
| 2021/0099963 | A1* | 4/2021 | Jeon | H04W 74/0866 |
| 2021/0126749 | A1* | 4/2021 | Iyer | H04B 7/0617 |
| 2021/0176780 | A1* | 6/2021 | Kang | H04W 74/004 |
| 2021/0250986 | A1* | 8/2021 | Luo | H04L 27/26134 |
| 2021/0266828 | A1* | 8/2021 | Hwang | H04W 72/14 |
| 2021/0289559 | A1* | 9/2021 | Sakhnini | H04L 27/2662 |
| 2021/0307074 | A1* | 9/2021 | Si | H04L 27/26025 |
| 2021/0352730 | A1* | 11/2021 | Yang | H04W 72/1268 |
| 2022/0086654 | A1* | 3/2022 | Li | H04W 74/0808 |
| 2022/0159730 | A1* | 5/2022 | Shin | H04L 1/1812 |
| 2022/0167436 | A1* | 5/2022 | Shin | H04W 74/0866 |
| 2022/0174753 | A1* | 6/2022 | Shin | H04W 74/0841 |
| 2022/0191936 | A1* | 6/2022 | Shin | H04W 74/0833 |

OTHER PUBLICATIONS

"5G; NR; Multiplexing and channel coding (3GPP TS 38.212 version 15.7.0 Release 15)", ETSI TS 138 212 V15.7.0, Oct. 2019, 106 pages.

"5G; NR; Physical layer procedures for control (3GPP TS 38.213 version 15.7.0 Release 15)", ETSI TS 138 213 v15.7.0, Oct. 2019, 112 pages.

"5G; NR; Physical layer procedures for data (3GPP TS 38.214 version 15.7.0 Release 15)", ETSI TS 138 214 V15.7.0, Oct. 2019, 108 pages.

"5G; NR; Radio Resource Control (RRC); Protocol specification (3GPP TS 38.331 version 15.7.0 Release 15)", ETSI TS 138 331 V15.7.0, Oct. 2019, 523 pages.

International Search Report of the International Searching Authority in connection with International Application No. PCT/KR2021/003648, dated Jun. 29, 2021, 3 pages.

Ericsson et al., "Introduction of DL RRC segmentation", 3GPP TSG-RAN2 Meeting #109 Online, R2-2002161, Feb. 24-Mar. 6, 2020, 539 pages.

* cited by examiner

FIG. 7

METHOD AND APPARATUS FOR ENHANCED PRACH PREAMBLE

CROSS-REFERENCE TO RELATED APPLICATIONS AND CLAIM OF PRIORITY

The present application claims priority to U.S. Provisional Patent Application No. 62/994,511, filed on Mar. 25, 2020 and U.S. Provisional Patent Application No. 63/004,169, filed on Apr. 2, 2020. The content of the above-identified patent document is incorporated herein by reference.

TECHNICAL FIELD

The present disclosure relates generally to wireless communication systems and, more specifically, the present disclosure relates to enhanced physical random access channel (PRACH) preamble.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to enhanced PRACH preamble.

In one embodiment, a base station (BS) in a wireless communication system is provided. The BS includes a processor configured to determine a numerology for a physical random access channel (PRACH) preamble that includes an extended cyclic prefix (CP) length and determine a PRACH preamble format that is based on orthogonal frequency division multiplexing (OFDM) symbols with the extended CP length. The BS also includes a transceiver operably connected to the processor. The transceiver is configured to transmit a set of higher layer parameters including the numerology for the PRACH preamble and the PRACH preamble format over a downlink channel.

In another embodiment, a user equipment (UE) in a wireless communication system is provided. The UE includes a transceiver configured to receive a set of higher layer parameters over a downlink channel and a processor that is operably connected to the transceiver. The processor is configured to determine, from the set of higher layer parameters, a numerology for a PRACH preamble that includes an extended CP length and determine, from the set of higher layer parameters, a PRACH preamble format that is based on OFDM symbols with the extended CP length.

In yet another embodiment, a method of a UE in a wireless communication system is provided. The method includes receiving a set of higher layer parameters over a downlink channel and determining, from the set of higher layer parameters, a numerology for a PRACH preamble. The numerology includes an extended CP length. The method further includes determining, from the set of higher layer parameters, a PRACH preamble format that is based on OFDM symbols with the extended CP length.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates example new PRACH preamble formats constructed from legacy Rel-15 PRACH format according to embodiments of the present disclosure;

DETAILED DESCRIPTION

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.7.0, "NR; Physical channels and modulation"; 3GPP TS 38.212 v15.7.0, "NR; Multiplexing and Channel coding"; 3GPP TS 38.213 v15.7.0, "NR; Physical Layer Procedures for Control"; 3GPP TS 38.214 v15.7.0, "NR; Physical Layer Procedures for Data"; and 3GPP TS 38.331 v15.7.0, "NR; Radio Resource Control (RRC) Protocol Specification."

Figure 1:
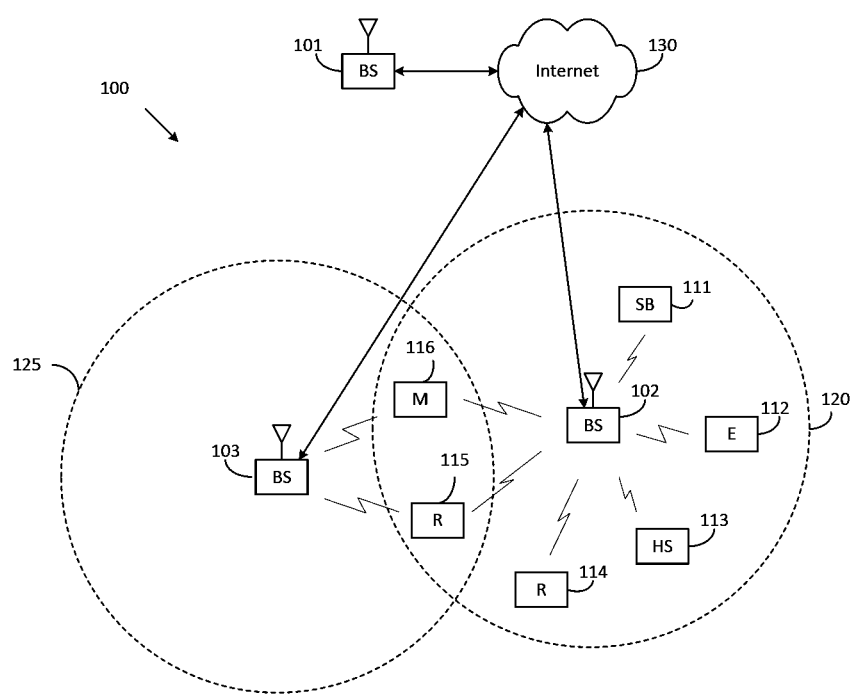
FIG. 1 illustrates an example wireless network according to embodiments of the present disclosure.
Figure 2:
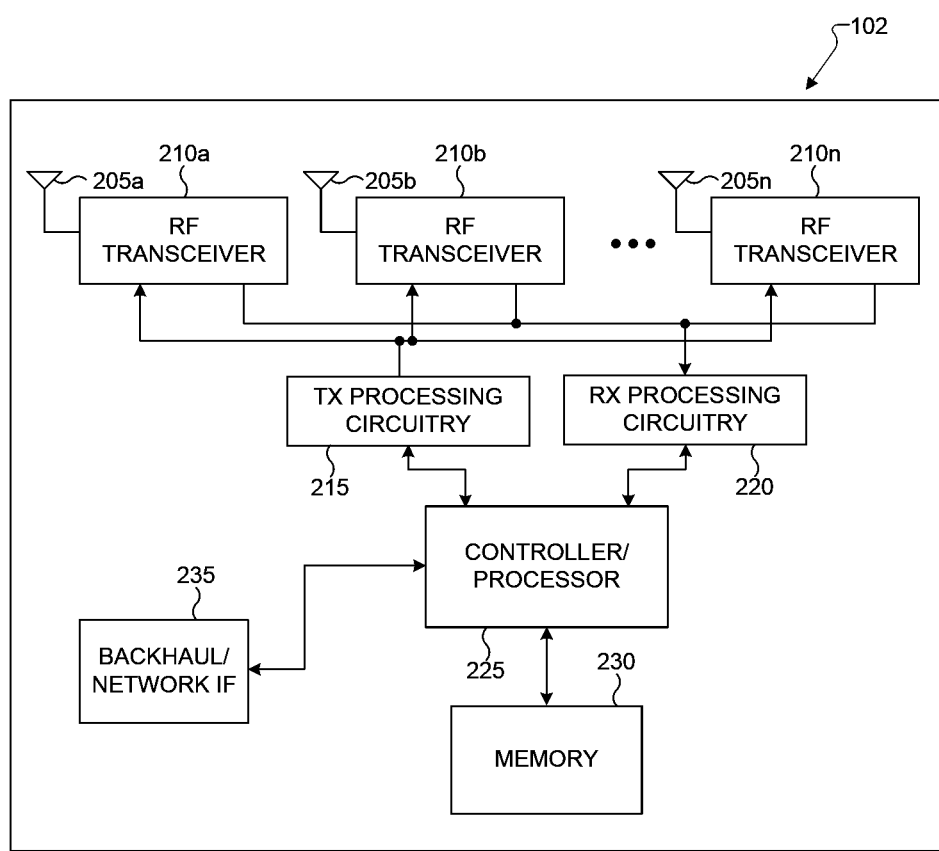
FIG. 2 illustrates an example gNB according to embodiments of the present disclosure.
Figure 3:
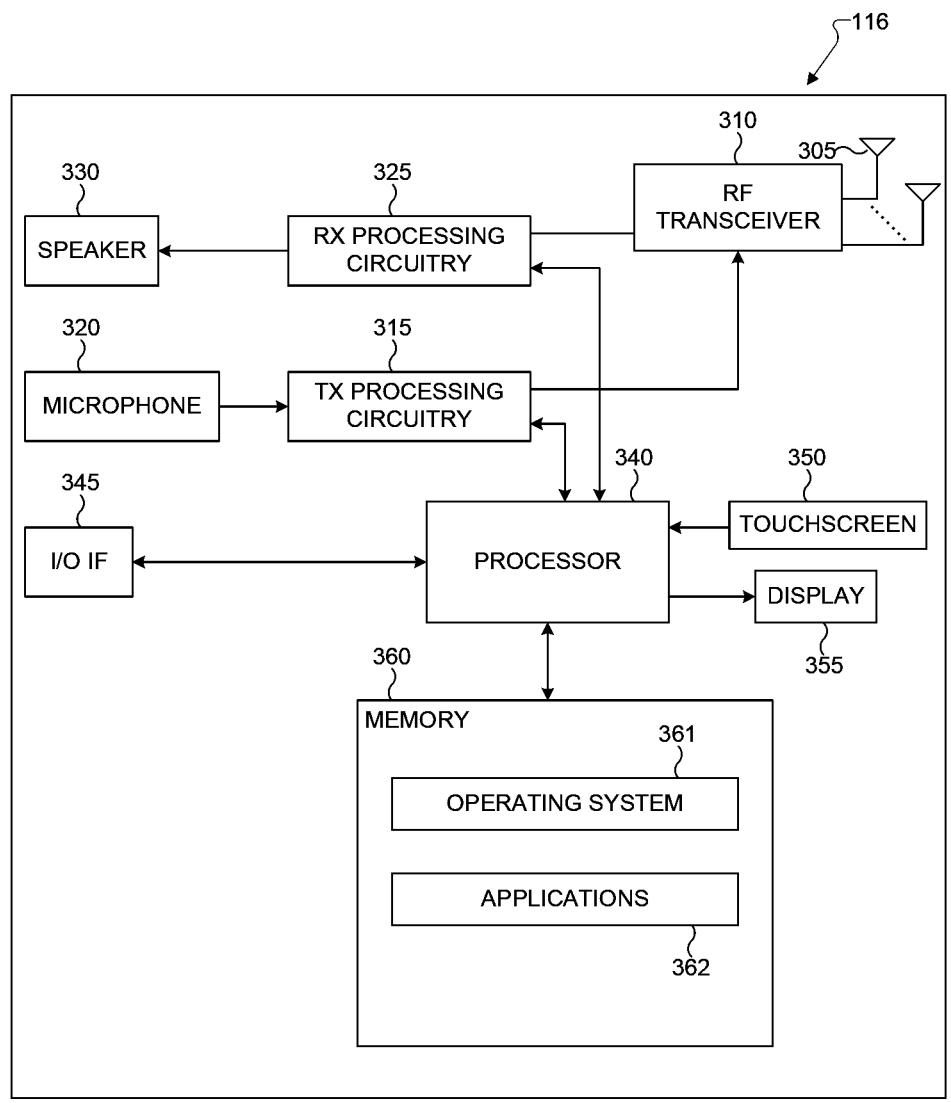
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), LTE-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, LTE, LTE-A, high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally provided a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for enhanced PRACH preamble transmission. In certain embodiments, and one or more of the gNBs 101-103 includes circuitry, programing, or a combination thereof for enhanced PRACH preamble reception.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for random access procedures. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is provided to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DM-RS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A demodulation reference signal (DM-RS) is transmitted only in the BW of a respective PDCCH or PDSCH and a UE can use the DM-RS to demodulate data or control information.

Figure 4:
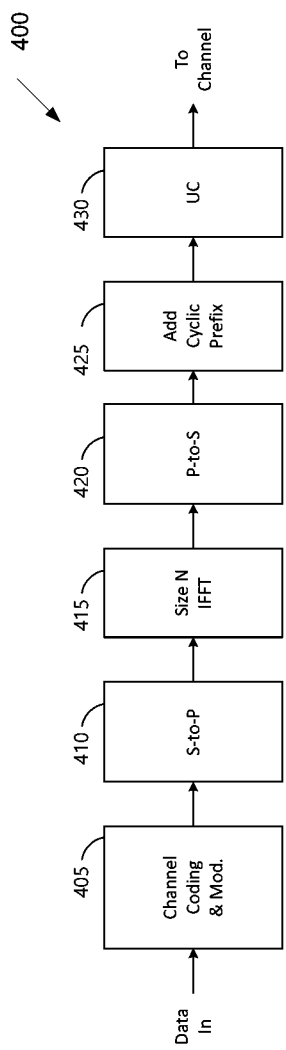
FIGS. 4 and 5 illustrate example wireless transmit and receive paths according to this disclosure.
Figure 5:
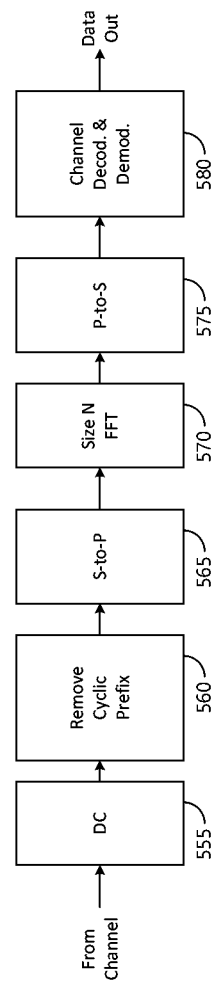

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for the random access procedures as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

The present disclosure focuses on the enhancement to the PRACH preamble design, to be applicable to wideband carrier. More precisely, the following components are included in this disclosure: a new PRACH preamble sequence length; logical root index enhancement; cyclic shift enhancement; PRACH preamble sequence mapping enhancement; and PRACH preamble format enhancement.

NR Rel-15 supports multiple PRACH preamble formats, wherein format 0, 1, 2, and 3 are for long preamble sequence length of 839 and with sub-carrier spacing (SCS) as either 1.25 kHz or 5 kHz, and format A1, A2, A3, B1, B2, B3, B4, C0, and C2 are for short preamble sequence length of 139 and with SCS as 15 kHz, 30 kHz, 60 kHz, and 120 kHz. An illustration of PRACH preamble formats with long sequence is shown in FIG. 6A, and an illustration of PRACH preamble formats with short sequence is shown in FIG. 6B.

Figure 6A:
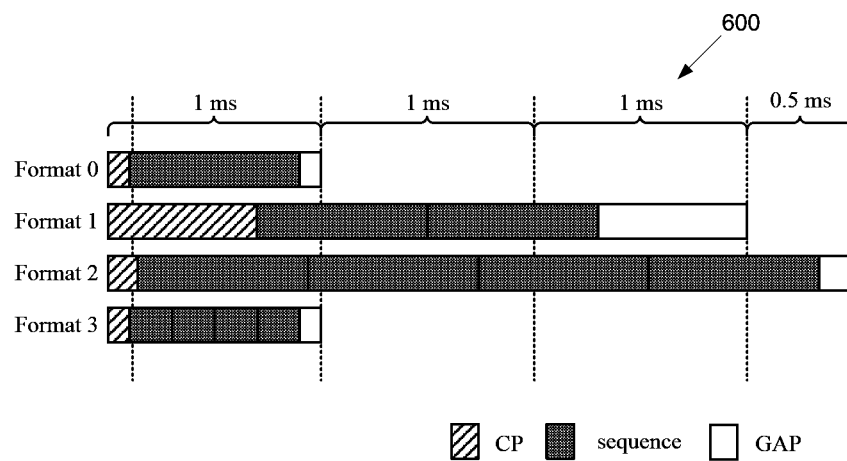
FIG. 6A illustrates example PRACH preamble formats with long sequence according to embodiments of the present disclosure.

FIG. 6A illustrates example PRACH preamble formats with long sequence 600 according to embodiments of the present disclosure. An embodiment of the PRACH preamble formats with long sequence 600 shown in FIG. 6A is for illustration only.

Figure 6B:
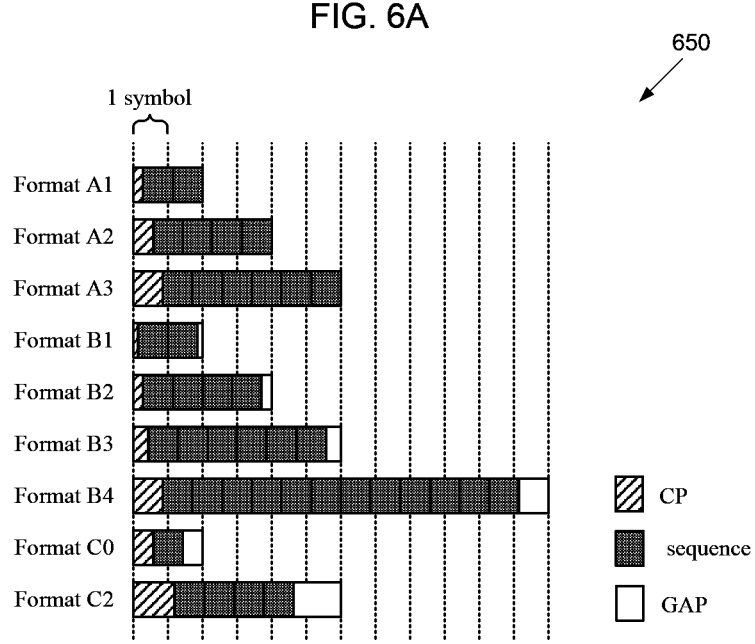
FIG. 6B illustrates example PRACH preamble formats with short sequence according to embodiments of the present disclosure.

FIG. 6B illustrates example PRACH preamble formats with short sequence 650 according to embodiments of the present disclosure. An embodiment of the PRACH preamble formats with short sequence 650 shown in FIG. 6B is for illustration only.

In NR Rel-16, two new PRACH preamble sequence lengths are introduced for operation with shared spectrum channel access (e.g., unlicensed or shared spectrum), for example, 1151 for 15 kHz SCS and 571 for 30 kHz, respectively. The new PRACH preamble sequence lengths are only applicable to FR1, and applicable to PRACH format A1, A2, A3, B1, B2, B3, B4, C0, and C2.

For higher carrier frequency range, transmissions may be subject to a much wider carrier bandwidth. For example, in 60 GHz unlicensed spectrum, a PRACH preamble transmission may be using a carrier with bandwidth of 2.16 GHz. For this higher carrier frequency range, there is a need to support new preamble length to satisfy the occupied channel bandwidth requirement, and the corresponding design of the cyclic shift of the sequence, the root index, and the sequence mapping may all be enhanced accordingly.

Although exemplary descriptions and embodiments to follow assume OFDM or OFDMA, the present disclosure can be extended to other OFDM-based transmission waveforms or multiple access schemes such as filtered OFDM (F-OFDM).

In one embodiment, for a given SCS, at least one PRACH preamble sequence length can be configured by a set of higher layer parameters, wherein the sequence length is denoted as $L_{RA}$.

In one example, the sequence length can be configured as the largest prime number smaller than the number of subcarriers within a number of RBs.

In one example, the number of RBs corresponds to the bandwidth of CORESET #0.

In another example, the number of RBs satisfies the occupied channel bandwidth (OCB) requirement, which is at least 70% of the nominal carrier bandwidth as 2.16 GHz.

A list of PRACH preamble sequence length for 960 kHz SCS is given in TABLE 1.

TABLE 1

Example PRACH preamble sequence length.

| Example # | Number of RB | OCB | $L_{RA}$ |
|---|---|---|---|
| 1 | 132 | 70.36% | 1583 |
| 2 | 168 | 89.38% | 2011 |
| 3 | 174 | 92.76% | 2087 |

In one embodiment, for a new PRACH preamble sequence length, the logical root index design is enhanced accordingly, wherein the logical root index is configured in the set of higher layer parameters.

For one example, the logical root index i and the sequence number u has a mapping relationship as follow: u=i/2+1, if i is even; and u=$L_{RA}$−1−(i−1)/2, if i is odd, wherein i∈ {0, 1, . . . , $L_{RA}$−2}.

For one example, the mapping between logical root index i and the sequence number u for $L_{RA}$=1583 is shown in TABLE 2A-1 and TABLE 2A-2.

TABLE 2A-1

Example mapping between logical root index i and the sequence number u for $L_{RA}$ = 1583.

| i | sequence number u in increasing order of logical root index i | | | | | | | | | |
|---|---|---|---|---|---|---|---|---|---|---|
| 0-19 | 1 | 1582 | 2 | 1581 | 3 | 1580 | 4 | 1579 | 5 | 1578 |
| 20-39 | 11 | 1572 | 12 | 1571 | 13 | 1570 | 14 | 1569 | 15 | 1568 |
| 40-59 | 21 | 1562 | 22 | 1561 | 23 | 1560 | 24 | 1559 | 25 | 1558 |
| 60-79 | 31 | 1552 | 32 | 1551 | 33 | 1550 | 34 | 1549 | 35 | 1548 |
| 80-99 | 41 | 1542 | 42 | 1541 | 43 | 1540 | 44 | 1539 | 45 | 1538 |
| 100-119 | 51 | 1532 | 52 | 1531 | 53 | 1530 | 54 | 1529 | 55 | 1528 |
| 120-139 | 61 | 1522 | 62 | 1521 | 63 | 1520 | 64 | 1519 | 65 | 1518 |
| 140-159 | 71 | 1512 | 72 | 1511 | 73 | 1510 | 74 | 1509 | 75 | 1508 |
| 160-179 | 81 | 1502 | 82 | 1501 | 83 | 1500 | 84 | 1499 | 85 | 1498 |
| 180-199 | 91 | 1492 | 92 | 1491 | 93 | 1490 | 94 | 1489 | 95 | 1488 |
| 200-219 | 101 | 1482 | 102 | 1481 | 103 | 1480 | 104 | 1479 | 105 | 1478 |
| 220-239 | 111 | 1472 | 112 | 1471 | 113 | 1470 | 114 | 1469 | 115 | 1468 |
| 240-259 | 121 | 1462 | 122 | 1461 | 123 | 1460 | 124 | 1459 | 125 | 1458 |
| 260-279 | 131 | 1452 | 132 | 1451 | 133 | 1450 | 134 | 1449 | 135 | 1448 |
| 280-299 | 141 | 1442 | 142 | 1441 | 143 | 1440 | 144 | 1439 | 145 | 1438 |
| 300-319 | 151 | 1432 | 152 | 1431 | 153 | 1430 | 154 | 1429 | 155 | 1428 |
| 320-339 | 161 | 1422 | 162 | 1421 | 163 | 1420 | 164 | 1419 | 165 | 1418 |
| 340-359 | 171 | 1412 | 172 | 1411 | 173 | 1410 | 174 | 1409 | 175 | 1408 |
| 360-379 | 181 | 1402 | 182 | 1401 | 183 | 1400 | 184 | 1399 | 185 | 1398 |
| 380-399 | 191 | 1392 | 192 | 1391 | 193 | 1390 | 194 | 1389 | 195 | 1388 |
| 400-419 | 201 | 1382 | 202 | 1381 | 203 | 1380 | 204 | 1379 | 205 | 1378 |
| 420-439 | 211 | 1372 | 212 | 1371 | 213 | 1370 | 214 | 1369 | 215 | 1368 |
| 440-459 | 221 | 1362 | 222 | 1361 | 223 | 1360 | 224 | 1359 | 225 | 1358 |
| 460-479 | 231 | 1352 | 232 | 1351 | 233 | 1350 | 234 | 1349 | 235 | 1348 |
| 480-499 | 241 | 1342 | 242 | 1341 | 243 | 1340 | 244 | 1339 | 245 | 1338 |
| 500-519 | 251 | 1332 | 252 | 1331 | 253 | 1330 | 254 | 1329 | 255 | 1328 |
| 520-539 | 261 | 1322 | 262 | 1321 | 263 | 1320 | 264 | 1319 | 265 | 1318 |
| 540-559 | 271 | 1312 | 272 | 1311 | 273 | 1310 | 274 | 1309 | 275 | 1308 |
| 560-579 | 281 | 1302 | 282 | 1301 | 283 | 1300 | 284 | 1299 | 285 | 1298 |
| 580-599 | 291 | 1292 | 292 | 1291 | 293 | 1290 | 294 | 1289 | 295 | 1288 |
| 600-619 | 301 | 1282 | 302 | 1281 | 303 | 1280 | 304 | 1279 | 305 | 1278 |
| 620-639 | 311 | 1272 | 312 | 1271 | 313 | 1270 | 314 | 1269 | 315 | 1268 |
| 640-659 | 321 | 1262 | 322 | 1261 | 323 | 1260 | 324 | 1259 | 325 | 1258 |
| 660-679 | 331 | 1252 | 332 | 1251 | 333 | 1250 | 334 | 1249 | 335 | 1248 |
| 680-699 | 341 | 1242 | 342 | 1241 | 343 | 1240 | 344 | 1239 | 345 | 1238 |
| 700-719 | 351 | 1232 | 352 | 1231 | 353 | 1230 | 354 | 1229 | 355 | 1228 |
| 720-739 | 361 | 1222 | 362 | 1221 | 363 | 1220 | 364 | 1219 | 365 | 1218 |
| 740-759 | 371 | 1212 | 372 | 1211 | 373 | 1210 | 374 | 1209 | 375 | 1208 |
| 760-779 | 381 | 1202 | 382 | 1201 | 383 | 1200 | 384 | 1199 | 385 | 1198 |
| 780-799 | 391 | 1192 | 392 | 1191 | 393 | 1190 | 394 | 1189 | 395 | 1188 |
| 800-819 | 401 | 1182 | 402 | 1181 | 403 | 1180 | 404 | 1179 | 405 | 1178 |
| 820-839 | 411 | 1172 | 412 | 1171 | 413 | 1170 | 414 | 1169 | 415 | 1168 |
| 840-859 | 421 | 1162 | 422 | 1161 | 423 | 1160 | 424 | 1159 | 425 | 1158 |

TABLE 2A-1-continued

Example mapping between logical root index i and the sequence number u for $L_{RA} = 1583$.

| i | sequence number u in increasing order of logical root index i | | | | | | | | |
|---|---|---|---|---|---|---|---|---|---|
| 860-879 | 431 | 1152 | 432 | 1151 | 433 | 1150 | 434 | 1149 | 435 | 1148 |
| 880-899 | 441 | 1142 | 442 | 1141 | 443 | 1140 | 444 | 1139 | 445 | 1138 |
| 900-919 | 451 | 1132 | 452 | 1131 | 453 | 1130 | 454 | 1129 | 455 | 1128 |
| 920-939 | 461 | 1122 | 462 | 1121 | 463 | 1120 | 464 | 1119 | 465 | 1118 |
| 940-959 | 471 | 1112 | 472 | 1111 | 473 | 1110 | 474 | 1109 | 475 | 1108 |
| 960-979 | 481 | 1102 | 482 | 1101 | 483 | 1100 | 484 | 1099 | 485 | 1098 |
| 980-999 | 491 | 1092 | 492 | 1091 | 493 | 1090 | 494 | 1089 | 495 | 1088 |
| 1000-1019 | 501 | 1082 | 502 | 1081 | 503 | 1080 | 504 | 1079 | 505 | 1078 |
| 1020-1039 | 511 | 1072 | 512 | 1071 | 513 | 1070 | 514 | 1069 | 515 | 1068 |
| 1040-1059 | 521 | 1062 | 522 | 1061 | 523 | 1060 | 524 | 1059 | 525 | 1058 |
| 1060-1079 | 531 | 1052 | 532 | 1051 | 533 | 1050 | 534 | 1049 | 535 | 1048 |
| 1080-1099 | 541 | 1042 | 542 | 1041 | 543 | 1040 | 544 | 1039 | 545 | 1038 |
| 1100-1119 | 551 | 1032 | 552 | 1031 | 553 | 1030 | 554 | 1029 | 555 | 1028 |
| 1120-1139 | 561 | 1022 | 562 | 1021 | 563 | 1020 | 564 | 1019 | 565 | 1018 |
| 1140-1159 | 571 | 1012 | 572 | 1011 | 573 | 1010 | 574 | 1009 | 575 | 1008 |
| 1160-1179 | 581 | 1002 | 582 | 1001 | 583 | 1000 | 584 | 999 | 585 | 998 |
| 1180-1199 | 591 | 992 | 592 | 991 | 593 | 990 | 594 | 989 | 595 | 988 |
| 1200-1219 | 601 | 982 | 602 | 981 | 603 | 980 | 604 | 979 | 605 | 978 |
| 1220-1239 | 611 | 972 | 612 | 971 | 613 | 970 | 614 | 969 | 615 | 968 |
| 1240-1259 | 621 | 962 | 622 | 961 | 623 | 960 | 624 | 959 | 625 | 958 |
| 1260-1279 | 631 | 952 | 632 | 951 | 633 | 950 | 634 | 949 | 635 | 948 |
| 1280-1299 | 641 | 942 | 642 | 941 | 643 | 940 | 644 | 939 | 645 | 938 |
| 1300-1319 | 651 | 932 | 652 | 931 | 653 | 930 | 654 | 929 | 655 | 928 |
| 1320-1339 | 661 | 922 | 662 | 921 | 663 | 920 | 664 | 919 | 665 | 918 |
| 1340-1359 | 671 | 912 | 672 | 911 | 673 | 910 | 674 | 909 | 675 | 908 |
| 1360-1379 | 681 | 902 | 682 | 901 | 683 | 900 | 684 | 899 | 685 | 898 |
| 1380-1399 | 691 | 892 | 692 | 891 | 693 | 890 | 694 | 889 | 695 | 888 |
| 1400-1419 | 701 | 882 | 702 | 881 | 703 | 880 | 704 | 879 | 705 | 878 |
| 1420-1439 | 711 | 872 | 712 | 871 | 713 | 870 | 714 | 869 | 715 | 868 |
| 1440-1459 | 721 | 862 | 722 | 861 | 723 | 860 | 724 | 859 | 725 | 858 |
| 1460-1479 | 731 | 852 | 732 | 851 | 733 | 850 | 734 | 849 | 735 | 848 |
| 1480-1499 | 741 | 842 | 742 | 841 | 743 | 840 | 744 | 839 | 745 | 838 |
| 1500-1519 | 751 | 832 | 752 | 831 | 753 | 830 | 754 | 829 | 755 | 828 |
| 1520-1539 | 761 | 822 | 762 | 821 | 763 | 820 | 764 | 819 | 765 | 818 |
| 1540-1559 | 771 | 812 | 772 | 811 | 773 | 810 | 774 | 809 | 775 | 808 |
| 1560-1579 | 781 | 802 | 782 | 801 | 783 | 800 | 784 | 799 | 785 | 798 |
| 1580-1581 | 791 | 792 | — | — | — | — | — | — | — | — |

TABLE 2A-2

Example mapping between logical root index i and the sequence number u for $L_{RA} = 1583$.

| i | sequence number u in increasing order of logical root index i | | | | | | | | |
|---|---|---|---|---|---|---|---|---|---|
| 0-19 | 6 | 1577 | 7 | 1576 | 8 | 1575 | 9 | 1574 | 10 | 1573 |
| 20-39 | 16 | 1567 | 17 | 1566 | 18 | 1565 | 19 | 1564 | 20 | 1563 |
| 40-59 | 26 | 1557 | 27 | 1556 | 28 | 1555 | 29 | 1554 | 30 | 1553 |
| 60-79 | 36 | 1547 | 37 | 1546 | 38 | 1545 | 39 | 1544 | 40 | 1543 |
| 80-99 | 46 | 1537 | 47 | 1536 | 48 | 1535 | 49 | 1534 | 50 | 1533 |
| 100-119 | 56 | 1527 | 57 | 1526 | 58 | 1525 | 59 | 1524 | 60 | 1523 |
| 120-139 | 66 | 1517 | 67 | 1516 | 68 | 1515 | 69 | 1514 | 70 | 1513 |
| 140-159 | 76 | 1507 | 77 | 1506 | 78 | 1505 | 79 | 1504 | 80 | 1503 |
| 160-179 | 86 | 1497 | 87 | 1496 | 88 | 1495 | 89 | 1494 | 90 | 1493 |
| 180-199 | 96 | 1487 | 97 | 1486 | 98 | 1485 | 99 | 1484 | 100 | 1483 |
| 200-219 | 106 | 1477 | 107 | 1476 | 108 | 1475 | 109 | 1474 | 110 | 1473 |
| 220-239 | 116 | 1467 | 117 | 1466 | 118 | 1465 | 119 | 1464 | 120 | 1463 |
| 240-259 | 126 | 1457 | 127 | 1456 | 128 | 1455 | 129 | 1454 | 130 | 1453 |
| 260-279 | 136 | 1447 | 137 | 1446 | 138 | 1445 | 139 | 1444 | 140 | 1443 |
| 280-299 | 146 | 1437 | 147 | 1436 | 148 | 1435 | 149 | 1434 | 150 | 1433 |
| 300-319 | 156 | 1427 | 157 | 1426 | 158 | 1425 | 159 | 1424 | 160 | 1423 |
| 320-339 | 166 | 1417 | 167 | 1416 | 168 | 1415 | 169 | 1414 | 170 | 1413 |
| 340-359 | 176 | 1407 | 177 | 1406 | 178 | 1405 | 179 | 1404 | 180 | 1403 |
| 360-379 | 186 | 1397 | 187 | 1396 | 188 | 1395 | 189 | 1394 | 190 | 1393 |
| 380-399 | 196 | 1387 | 197 | 1386 | 198 | 1385 | 199 | 1384 | 200 | 1383 |
| 400-419 | 206 | 1377 | 207 | 1376 | 208 | 1375 | 209 | 1374 | 210 | 1373 |
| 420-439 | 216 | 1367 | 217 | 1366 | 218 | 1365 | 219 | 1364 | 220 | 1363 |
| 440-459 | 226 | 1357 | 227 | 1356 | 228 | 1355 | 229 | 1354 | 230 | 1353 |
| 460-479 | 236 | 1347 | 237 | 1346 | 238 | 1345 | 239 | 1344 | 240 | 1343 |
| 480-499 | 246 | 1337 | 247 | 1336 | 248 | 1335 | 249 | 1334 | 250 | 1333 |
| 500-519 | 256 | 1327 | 257 | 1326 | 258 | 1325 | 259 | 1324 | 260 | 1323 |
| 520-539 | 266 | 1317 | 267 | 1316 | 268 | 1315 | 269 | 1314 | 270 | 1313 |
| 540-559 | 276 | 1307 | 277 | 1306 | 278 | 1305 | 279 | 1304 | 280 | 1303 |
| 560-579 | 286 | 1297 | 287 | 1296 | 288 | 1295 | 289 | 1294 | 290 | 1293 |

TABLE 2A-2-continued

Example mapping between logical root index i and the sequence number u for $L_{RA}$ = 1583.

| i | sequence number u in increasing order of logical root index i | | | | | | | | |
|---|---|---|---|---|---|---|---|---|---|
| 580-599 | 296 | 1287 | 297 | 1286 | 298 | 1285 | 299 | 1284 | 300 | 1283 |
| 600-619 | 306 | 1277 | 307 | 1276 | 308 | 1275 | 309 | 1274 | 310 | 1273 |
| 620-639 | 316 | 1267 | 317 | 1266 | 318 | 1265 | 319 | 1264 | 320 | 1263 |
| 640-659 | 326 | 1257 | 327 | 1256 | 328 | 1255 | 329 | 1254 | 330 | 1253 |
| 660-679 | 336 | 1247 | 337 | 1246 | 338 | 1245 | 339 | 1244 | 340 | 1243 |
| 680-699 | 346 | 1237 | 347 | 1236 | 348 | 1235 | 349 | 1234 | 350 | 1233 |
| 700-719 | 356 | 1227 | 357 | 1226 | 358 | 1225 | 359 | 1224 | 360 | 1223 |
| 720-739 | 366 | 1217 | 367 | 1216 | 368 | 1215 | 369 | 1214 | 370 | 1213 |
| 740-759 | 376 | 1207 | 377 | 1206 | 378 | 1205 | 379 | 1204 | 380 | 1203 |
| 760-779 | 386 | 1197 | 387 | 1196 | 388 | 1195 | 389 | 1194 | 390 | 1193 |
| 780-799 | 396 | 1187 | 397 | 1186 | 398 | 1185 | 399 | 1184 | 400 | 1183 |
| 800-819 | 406 | 1177 | 407 | 1176 | 408 | 1175 | 409 | 1174 | 410 | 1173 |
| 820-839 | 416 | 1167 | 417 | 1166 | 418 | 1165 | 419 | 1164 | 420 | 1163 |
| 840-859 | 426 | 1157 | 427 | 1156 | 428 | 1155 | 429 | 1154 | 430 | 1153 |
| 860-879 | 436 | 1147 | 437 | 1146 | 438 | 1145 | 439 | 1144 | 440 | 1143 |
| 880-899 | 446 | 1137 | 447 | 1136 | 448 | 1135 | 449 | 1134 | 450 | 1133 |
| 900-919 | 456 | 1127 | 457 | 1126 | 458 | 1125 | 459 | 1124 | 460 | 1123 |
| 920-939 | 466 | 1117 | 467 | 1116 | 468 | 1115 | 469 | 1114 | 470 | 1113 |
| 940-959 | 476 | 1107 | 477 | 1106 | 478 | 1105 | 479 | 1104 | 480 | 1103 |
| 960-979 | 486 | 1097 | 487 | 1096 | 488 | 1095 | 489 | 1094 | 490 | 1093 |
| 980-999 | 496 | 1087 | 497 | 1086 | 498 | 1085 | 499 | 1084 | 500 | 1083 |
| 1000-1019 | 506 | 1077 | 507 | 1076 | 508 | 1075 | 509 | 1074 | 510 | 1073 |
| 1020-1039 | 516 | 1067 | 517 | 1066 | 518 | 1065 | 519 | 1064 | 520 | 1063 |
| 1040-1059 | 526 | 1057 | 527 | 1056 | 528 | 1055 | 529 | 1054 | 530 | 1053 |
| 1060-1079 | 536 | 1047 | 537 | 1046 | 538 | 1045 | 539 | 1044 | 540 | 1043 |
| 1080-1099 | 546 | 1037 | 547 | 1036 | 548 | 1035 | 549 | 1034 | 550 | 1033 |
| 1100-1119 | 556 | 1027 | 557 | 1026 | 558 | 1025 | 559 | 1024 | 560 | 1023 |
| 1120-1139 | 566 | 1017 | 567 | 1016 | 568 | 1015 | 569 | 1014 | 570 | 1013 |
| 1140-1159 | 576 | 1007 | 577 | 1006 | 578 | 1005 | 579 | 1004 | 580 | 1003 |
| 1160-1179 | 586 | 997 | 587 | 996 | 588 | 995 | 589 | 994 | 590 | 993 |
| 1180-1199 | 596 | 987 | 597 | 986 | 598 | 985 | 599 | 984 | 600 | 983 |
| 1200-1219 | 606 | 977 | 607 | 976 | 608 | 975 | 609 | 974 | 610 | 973 |
| 1220-1239 | 616 | 967 | 617 | 966 | 618 | 965 | 619 | 964 | 620 | 963 |
| 1240-1259 | 626 | 957 | 627 | 956 | 628 | 955 | 629 | 954 | 630 | 953 |
| 1260-1279 | 636 | 947 | 637 | 946 | 638 | 945 | 639 | 944 | 640 | 943 |
| 1280-1299 | 646 | 937 | 647 | 936 | 648 | 935 | 649 | 934 | 650 | 933 |
| 1300-1319 | 656 | 927 | 657 | 926 | 658 | 925 | 659 | 924 | 660 | 923 |
| 1320-1339 | 666 | 917 | 667 | 916 | 668 | 915 | 669 | 914 | 670 | 913 |
| 1340-1359 | 676 | 907 | 677 | 906 | 678 | 905 | 679 | 904 | 680 | 903 |
| 1360-1379 | 686 | 897 | 687 | 896 | 688 | 895 | 689 | 894 | 690 | 893 |
| 1380-1399 | 696 | 887 | 697 | 886 | 698 | 885 | 699 | 884 | 700 | 883 |
| 1400-1419 | 706 | 877 | 707 | 876 | 708 | 875 | 709 | 874 | 710 | 873 |
| 1420-1439 | 716 | 867 | 717 | 866 | 718 | 865 | 719 | 864 | 720 | 863 |
| 1440-1459 | 726 | 857 | 727 | 856 | 728 | 855 | 729 | 854 | 730 | 853 |
| 1460-1479 | 736 | 847 | 737 | 846 | 738 | 845 | 739 | 844 | 740 | 843 |
| 1480-1499 | 746 | 837 | 747 | 836 | 748 | 835 | 749 | 834 | 750 | 833 |
| 1500-1519 | 756 | 827 | 757 | 826 | 758 | 825 | 759 | 824 | 760 | 823 |
| 1520-1539 | 766 | 817 | 767 | 816 | 768 | 815 | 769 | 814 | 770 | 813 |
| 1540-1559 | 776 | 807 | 777 | 806 | 778 | 805 | 779 | 804 | 780 | 803 |
| 1560-1579 | 786 | 797 | 787 | 796 | 788 | 795 | 789 | 794 | 790 | 793 |
| 1580-1581 | — | — | — | — | — | — | — | — | |

For another example, the mapping between logical root index i and the sequence number u for $L_{RA}$=2011 is shown in TABLE 2.

TABLE 2B-1

Example mapping between logical root index i and the sequence number u for $L_{RA}$ = 2011.

| i | sequence number u in increasing order of logical root index i | | | | | | | | |
|---|---|---|---|---|---|---|---|---|---|
| 0-19 | 1 | 2010 | 2 | 2009 | 3 | 2008 | 4 | 2007 | 5 | 2006 |
| 20-39 | 11 | 2000 | 12 | 1999 | 13 | 1998 | 14 | 1997 | 15 | 1996 |
| 40-59 | 21 | 1990 | 22 | 1989 | 23 | 1988 | 24 | 1987 | 25 | 1986 |
| 60-79 | 31 | 1980 | 32 | 1979 | 33 | 1978 | 34 | 1977 | 35 | 1976 |
| 80-99 | 41 | 1970 | 42 | 1969 | 43 | 1968 | 44 | 1967 | 45 | 1966 |
| 100-119 | 51 | 1960 | 52 | 1959 | 53 | 1958 | 54 | 1957 | 55 | 1956 |
| 120-139 | 61 | 1950 | 62 | 1949 | 63 | 1948 | 64 | 1947 | 65 | 1946 |
| 140-159 | 71 | 1940 | 72 | 1939 | 73 | 1938 | 74 | 1937 | 75 | 1936 |
| 160-179 | 81 | 1930 | 82 | 1929 | 83 | 1928 | 84 | 1927 | 85 | 1926 |
| 180-199 | 91 | 1920 | 92 | 1919 | 93 | 1918 | 94 | 1917 | 95 | 1916 |
| 200-219 | 101 | 1910 | 102 | 1909 | 103 | 1908 | 104 | 1907 | 105 | 1906 |

TABLE 2B-1-continued

Example mapping between logical root index i and the sequence number u for $L_{RA} = 2011$.

| i | sequence number u in increasing order of logical root index i | | | | | | | | |
|---|---|---|---|---|---|---|---|---|---|
| 220-239 | 111 | 1900 | 112 | 1899 | 113 | 1898 | 114 | 1897 | 115 | 1896 |
| 240-259 | 121 | 1890 | 122 | 1889 | 123 | 1888 | 124 | 1887 | 125 | 1886 |
| 260-279 | 131 | 1880 | 132 | 1879 | 133 | 1878 | 134 | 1877 | 135 | 1876 |
| 280-299 | 141 | 1870 | 142 | 1869 | 143 | 1868 | 144 | 1867 | 145 | 1866 |
| 300-319 | 151 | 1860 | 152 | 1859 | 153 | 1858 | 154 | 1857 | 155 | 1856 |
| 320-339 | 161 | 1850 | 162 | 1849 | 163 | 1848 | 164 | 1847 | 165 | 1846 |
| 340-359 | 171 | 1840 | 172 | 1839 | 173 | 1838 | 174 | 1837 | 175 | 1836 |
| 360-379 | 181 | 1830 | 182 | 1829 | 183 | 1828 | 184 | 1827 | 185 | 1826 |
| 380-399 | 191 | 1820 | 192 | 1819 | 193 | 1818 | 194 | 1817 | 195 | 1816 |
| 400-419 | 201 | 1810 | 202 | 1809 | 203 | 1808 | 204 | 1807 | 205 | 1806 |
| 420-439 | 211 | 1800 | 212 | 1799 | 213 | 1798 | 214 | 1797 | 215 | 1796 |
| 440-459 | 221 | 1790 | 222 | 1789 | 223 | 1788 | 224 | 1787 | 225 | 1786 |
| 460-479 | 231 | 1780 | 232 | 1779 | 233 | 1778 | 234 | 1777 | 235 | 1776 |
| 480-499 | 241 | 1770 | 242 | 1769 | 243 | 1768 | 244 | 1767 | 245 | 1766 |
| 500-519 | 251 | 1760 | 252 | 1759 | 253 | 1758 | 254 | 1757 | 255 | 1756 |
| 520-539 | 261 | 1750 | 262 | 1749 | 263 | 1748 | 264 | 1747 | 265 | 1746 |
| 540-559 | 271 | 1740 | 272 | 1739 | 273 | 1738 | 274 | 1737 | 275 | 1736 |
| 560-579 | 281 | 1730 | 282 | 1729 | 283 | 1728 | 284 | 1727 | 285 | 1726 |
| 580-599 | 291 | 1720 | 292 | 1719 | 293 | 1718 | 294 | 1717 | 295 | 1716 |
| 600-619 | 301 | 1710 | 302 | 1709 | 303 | 1708 | 304 | 1707 | 305 | 1706 |
| 620-639 | 311 | 1700 | 312 | 1699 | 313 | 1698 | 314 | 1697 | 315 | 1696 |
| 640-659 | 321 | 1690 | 322 | 1689 | 323 | 1688 | 324 | 1687 | 325 | 1686 |
| 660-679 | 331 | 1680 | 332 | 1679 | 333 | 1678 | 334 | 1677 | 335 | 1676 |
| 680-699 | 341 | 1670 | 342 | 1669 | 343 | 1668 | 344 | 1667 | 345 | 1666 |
| 700-719 | 351 | 1660 | 352 | 1659 | 353 | 1658 | 354 | 1657 | 355 | 1656 |
| 720-739 | 361 | 1650 | 362 | 1649 | 363 | 1648 | 364 | 1647 | 365 | 1646 |
| 740-759 | 371 | 1640 | 372 | 1639 | 373 | 1638 | 374 | 1637 | 375 | 1636 |
| 760-779 | 381 | 1630 | 382 | 1629 | 383 | 1628 | 384 | 1627 | 385 | 1626 |
| 780-799 | 391 | 1620 | 392 | 1619 | 393 | 1618 | 394 | 1617 | 395 | 1616 |
| 800-819 | 401 | 1610 | 402 | 1609 | 403 | 1608 | 404 | 1607 | 405 | 1606 |
| 820-839 | 411 | 1600 | 412 | 1599 | 413 | 1598 | 414 | 1597 | 415 | 1596 |
| 840-859 | 421 | 1590 | 422 | 1589 | 423 | 1588 | 424 | 1587 | 425 | 1586 |
| 860-879 | 431 | 1580 | 432 | 1579 | 433 | 1578 | 434 | 1577 | 435 | 1576 |
| 880-899 | 441 | 1570 | 442 | 1569 | 443 | 1568 | 444 | 1567 | 445 | 1566 |
| 900-919 | 451 | 1560 | 452 | 1559 | 453 | 1558 | 454 | 1557 | 455 | 1556 |
| 920-939 | 461 | 1550 | 462 | 1549 | 463 | 1548 | 464 | 1547 | 465 | 1546 |
| 940-959 | 471 | 1540 | 472 | 1539 | 473 | 1538 | 474 | 1537 | 475 | 1536 |
| 960-979 | 481 | 1530 | 482 | 1529 | 483 | 1528 | 484 | 1527 | 485 | 1526 |
| 980-999 | 491 | 1520 | 492 | 1519 | 493 | 1518 | 494 | 1517 | 495 | 1516 |
| 1000-1019 | 501 | 1510 | 502 | 1509 | 503 | 1508 | 504 | 1507 | 505 | 1506 |
| 1020-1039 | 511 | 1500 | 512 | 1499 | 513 | 1498 | 514 | 1497 | 515 | 1496 |
| 1040-1059 | 521 | 1490 | 522 | 1489 | 523 | 1488 | 524 | 1487 | 525 | 1486 |
| 1060-1079 | 531 | 1480 | 532 | 1479 | 533 | 1478 | 534 | 1477 | 535 | 1476 |
| 1080-1099 | 541 | 1470 | 542 | 1469 | 543 | 1468 | 544 | 1467 | 545 | 1466 |
| 1100-1119 | 551 | 1460 | 552 | 1459 | 553 | 1458 | 554 | 1457 | 555 | 1456 |
| 1120-1139 | 561 | 1450 | 562 | 1449 | 563 | 1448 | 564 | 1447 | 565 | 1446 |
| 1140-1159 | 571 | 1440 | 572 | 1439 | 573 | 1438 | 574 | 1437 | 575 | 1436 |
| 1160-1179 | 581 | 1430 | 582 | 1429 | 583 | 1428 | 584 | 1427 | 585 | 1426 |
| 1180-1199 | 591 | 1420 | 592 | 1419 | 593 | 1418 | 594 | 1417 | 595 | 1416 |
| 1200-1219 | 601 | 1410 | 602 | 1409 | 603 | 1408 | 604 | 1407 | 605 | 1406 |
| 1220-1239 | 611 | 1400 | 612 | 1399 | 613 | 1398 | 614 | 1397 | 615 | 1396 |
| 1240-1259 | 621 | 1390 | 622 | 1389 | 623 | 1388 | 624 | 1387 | 625 | 1386 |
| 1260-1279 | 631 | 1380 | 632 | 1379 | 633 | 1378 | 634 | 1377 | 635 | 1376 |
| 1280-1299 | 641 | 1370 | 642 | 1369 | 643 | 1368 | 644 | 1367 | 645 | 1366 |
| 1300-1319 | 651 | 1360 | 652 | 1359 | 653 | 1358 | 654 | 1357 | 655 | 1356 |
| 1320-1339 | 661 | 1350 | 662 | 1349 | 663 | 1348 | 664 | 1347 | 665 | 1346 |
| 1340-1359 | 671 | 1340 | 672 | 1339 | 673 | 1338 | 674 | 1337 | 675 | 1336 |
| 1360-1379 | 681 | 1330 | 682 | 1329 | 683 | 1328 | 684 | 1327 | 685 | 1326 |
| 1380-1399 | 691 | 1320 | 692 | 1319 | 693 | 1318 | 694 | 1317 | 695 | 1316 |
| 1400-1419 | 701 | 1310 | 702 | 1309 | 703 | 1308 | 704 | 1307 | 705 | 1306 |
| 1420-1439 | 711 | 1300 | 712 | 1299 | 713 | 1298 | 714 | 1297 | 715 | 1296 |
| 1440-1459 | 721 | 1290 | 722 | 1289 | 723 | 1288 | 724 | 1287 | 725 | 1286 |
| 1460-1479 | 731 | 1280 | 732 | 1279 | 733 | 1278 | 734 | 1277 | 735 | 1276 |
| 1480-1499 | 741 | 1270 | 742 | 1269 | 743 | 1268 | 744 | 1267 | 745 | 1266 |
| 1500-1519 | 751 | 1260 | 752 | 1259 | 753 | 1258 | 754 | 1257 | 755 | 1256 |
| 1520-1539 | 761 | 1250 | 762 | 1249 | 763 | 1248 | 764 | 1247 | 765 | 1246 |
| 1540-1559 | 771 | 1240 | 772 | 1239 | 773 | 1238 | 774 | 1237 | 775 | 1236 |
| 1560-1579 | 781 | 1230 | 782 | 1229 | 783 | 1228 | 784 | 1227 | 785 | 1226 |
| 1580-1599 | 791 | 1220 | 792 | 1219 | 793 | 1218 | 794 | 1217 | 795 | 1216 |
| 1600-1619 | 801 | 1210 | 802 | 1209 | 803 | 1208 | 804 | 1207 | 805 | 1206 |
| 1620-1639 | 811 | 1200 | 812 | 1199 | 813 | 1198 | 814 | 1197 | 815 | 1196 |
| 1640-1659 | 821 | 1190 | 822 | 1189 | 823 | 1188 | 824 | 1187 | 825 | 1186 |
| 1660-1679 | 831 | 1180 | 832 | 1179 | 833 | 1178 | 834 | 1177 | 835 | 1176 |
| 1680-1699 | 841 | 1170 | 842 | 1169 | 843 | 1168 | 844 | 1167 | 845 | 1166 |
| 1700-1719 | 851 | 1160 | 852 | 1159 | 853 | 1158 | 854 | 1157 | 855 | 1156 |
| 1720-1739 | 861 | 1150 | 862 | 1149 | 863 | 1148 | 864 | 1147 | 865 | 1146 |

TABLE 2B-1-continued

Example mapping between logical root index i and the sequence number u for $L_{RA} = 2011$.

| i | sequence number u in increasing order of logical root index i | | | | | | | | |
|---|---|---|---|---|---|---|---|---|---|
| 1740-1759 | 871 | 1140 | 872 | 1139 | 873 | 1138 | 874 | 1137 | 875 | 1136 |
| 1760-1779 | 881 | 1130 | 882 | 1129 | 883 | 1128 | 884 | 1127 | 885 | 1126 |
| 1780-1799 | 891 | 1120 | 892 | 1119 | 893 | 1118 | 894 | 1117 | 895 | 1116 |
| 1800-1819 | 901 | 1110 | 902 | 1109 | 903 | 1108 | 904 | 1107 | 905 | 1106 |
| 1820-1839 | 911 | 1100 | 912 | 1099 | 913 | 1098 | 914 | 1097 | 915 | 1096 |
| 1840-1859 | 921 | 1090 | 922 | 1089 | 923 | 1088 | 924 | 1087 | 925 | 1086 |
| 1860-1879 | 931 | 1080 | 932 | 1079 | 933 | 1078 | 934 | 1077 | 935 | 1076 |
| 1880-1899 | 941 | 1070 | 942 | 1069 | 943 | 1068 | 944 | 1067 | 945 | 1066 |
| 1900-1919 | 951 | 1060 | 952 | 1059 | 953 | 1058 | 954 | 1057 | 955 | 1056 |
| 1920-1939 | 961 | 1050 | 962 | 1049 | 963 | 1048 | 964 | 1047 | 965 | 1046 |
| 1940-1959 | 971 | 1040 | 972 | 1039 | 973 | 1038 | 974 | 1037 | 975 | 1036 |
| 1960-1979 | 981 | 1030 | 982 | 1029 | 983 | 1028 | 984 | 1027 | 985 | 1026 |
| 1980-1999 | 991 | 1020 | 992 | 1019 | 993 | 1018 | 994 | 1017 | 995 | 1016 |
| 2000-2009 | 1001 | 1010 | 1002 | 1009 | 1003 | 1008 | 1004 | 1007 | 1005 | 1006 |

TABLE 2B-2

Example mapping between logical root index i and the sequence number u for $L_{RA} = 2011$.

| i | sequence number u in increasing order of logical root index i | | | | | | | | |
|---|---|---|---|---|---|---|---|---|---|
| 0-19 | 6 | 2005 | 7 | 2004 | 8 | 2003 | 9 | 2002 | 10 | 2001 |
| 20-39 | 16 | 1995 | 17 | 1994 | 18 | 1993 | 19 | 1992 | 20 | 1991 |
| 40-59 | 26 | 1985 | 27 | 1984 | 28 | 1983 | 29 | 1982 | 30 | 1981 |
| 60-79 | 36 | 1975 | 37 | 1974 | 38 | 1973 | 39 | 1972 | 40 | 1971 |
| 80-99 | 46 | 1965 | 47 | 1964 | 48 | 1963 | 49 | 1962 | 50 | 1961 |
| 100-119 | 56 | 1955 | 57 | 1954 | 58 | 1953 | 59 | 1952 | 60 | 1951 |
| 120-139 | 66 | 1945 | 67 | 1944 | 68 | 1943 | 69 | 1942 | 70 | 1941 |
| 140-159 | 76 | 1935 | 77 | 1934 | 78 | 1933 | 79 | 1932 | 80 | 1931 |
| 160-179 | 86 | 1925 | 87 | 1924 | 88 | 1923 | 89 | 1922 | 90 | 1921 |
| 180-199 | 96 | 1915 | 97 | 1914 | 98 | 1913 | 99 | 1912 | 100 | 1911 |
| 200-219 | 106 | 1905 | 107 | 1904 | 108 | 1903 | 109 | 1902 | 110 | 1901 |
| 220-239 | 116 | 1895 | 117 | 1894 | 118 | 1893 | 119 | 1892 | 120 | 1891 |
| 240-259 | 126 | 1885 | 127 | 1884 | 128 | 1883 | 129 | 1882 | 130 | 1881 |
| 260-279 | 136 | 1875 | 137 | 1874 | 138 | 1873 | 139 | 1872 | 140 | 1871 |
| 280-299 | 146 | 1865 | 147 | 1864 | 148 | 1863 | 149 | 1862 | 150 | 1861 |
| 300-319 | 156 | 1855 | 157 | 1854 | 158 | 1853 | 159 | 1852 | 160 | 1851 |
| 320-339 | 166 | 1845 | 167 | 1844 | 168 | 1843 | 169 | 1842 | 170 | 1841 |
| 340-359 | 176 | 1835 | 177 | 1834 | 178 | 1833 | 179 | 1832 | 180 | 1831 |
| 360-379 | 186 | 1825 | 187 | 1824 | 188 | 1823 | 189 | 1822 | 190 | 1821 |
| 380-399 | 196 | 1815 | 197 | 1814 | 198 | 1813 | 199 | 1812 | 200 | 1811 |
| 400-419 | 206 | 1805 | 207 | 1804 | 208 | 1803 | 209 | 1802 | 210 | 1801 |
| 420-439 | 216 | 1795 | 217 | 1794 | 218 | 1793 | 219 | 1792 | 220 | 1791 |
| 440-459 | 226 | 1785 | 227 | 1784 | 228 | 1783 | 229 | 1782 | 230 | 1781 |
| 460-479 | 236 | 1775 | 237 | 1774 | 238 | 1773 | 239 | 1772 | 240 | 1771 |
| 480-499 | 246 | 1765 | 247 | 1764 | 248 | 1763 | 249 | 1762 | 250 | 1761 |
| 500-519 | 256 | 1755 | 257 | 1754 | 258 | 1753 | 259 | 1752 | 260 | 1751 |
| 520-539 | 266 | 1745 | 267 | 1744 | 268 | 1743 | 269 | 1742 | 270 | 1741 |
| 540-559 | 276 | 1735 | 277 | 1734 | 278 | 1733 | 279 | 1732 | 280 | 1731 |
| 560-579 | 286 | 1725 | 287 | 1724 | 288 | 1723 | 289 | 1722 | 290 | 1721 |
| 580-599 | 296 | 1715 | 297 | 1714 | 298 | 1713 | 299 | 1712 | 300 | 1711 |
| 600-619 | 306 | 1705 | 307 | 1704 | 308 | 1703 | 309 | 1702 | 310 | 1701 |
| 620-639 | 316 | 1695 | 317 | 1694 | 318 | 1693 | 319 | 1692 | 320 | 1691 |
| 640-659 | 326 | 1685 | 327 | 1684 | 328 | 1683 | 329 | 1682 | 330 | 1681 |
| 660-679 | 336 | 1675 | 337 | 1674 | 338 | 1673 | 339 | 1672 | 340 | 1671 |
| 680-699 | 346 | 1665 | 347 | 1664 | 348 | 1663 | 349 | 1662 | 350 | 1661 |
| 700-719 | 356 | 1655 | 357 | 1654 | 358 | 1653 | 359 | 1652 | 360 | 1651 |
| 720-739 | 366 | 1645 | 367 | 1644 | 368 | 1643 | 369 | 1642 | 370 | 1641 |
| 740-759 | 376 | 1635 | 377 | 1634 | 378 | 1633 | 379 | 1632 | 380 | 1631 |
| 760-779 | 386 | 1625 | 387 | 1624 | 388 | 1623 | 389 | 1622 | 390 | 1621 |
| 780-799 | 396 | 1615 | 397 | 1614 | 398 | 1613 | 399 | 1612 | 400 | 1611 |
| 800-819 | 406 | 1605 | 407 | 1604 | 408 | 1603 | 409 | 1602 | 410 | 1601 |
| 820-839 | 416 | 1595 | 417 | 1594 | 418 | 1593 | 419 | 1592 | 420 | 1591 |
| 840-859 | 426 | 1585 | 427 | 1584 | 428 | 1583 | 429 | 1582 | 430 | 1581 |
| 860-879 | 436 | 1575 | 437 | 1574 | 438 | 1573 | 439 | 1572 | 440 | 1571 |
| 880-899 | 446 | 1565 | 447 | 1564 | 448 | 1563 | 449 | 1562 | 450 | 1561 |
| 900-919 | 456 | 1555 | 457 | 1554 | 458 | 1553 | 459 | 1552 | 460 | 1551 |
| 920-939 | 466 | 1545 | 467 | 1544 | 468 | 1543 | 469 | 1542 | 470 | 1541 |
| 940-959 | 476 | 1535 | 477 | 1534 | 478 | 1533 | 479 | 1532 | 480 | 1531 |
| 960-979 | 486 | 1525 | 487 | 1524 | 488 | 1523 | 489 | 1522 | 490 | 1521 |
| 980-999 | 496 | 1515 | 497 | 1514 | 498 | 1513 | 499 | 1512 | 500 | 1511 |
| 1000-1019 | 506 | 1505 | 507 | 1504 | 508 | 1503 | 509 | 1502 | 510 | 1501 |
| 1020-1039 | 516 | 1495 | 517 | 1494 | 518 | 1493 | 519 | 1492 | 520 | 1491 |

TABLE 2B-2-continued

Example mapping between logical root index i and the sequence number u for $L_{RA} = 2011$.

| i | sequence number u in increasing order of logical root index i | | | | | | | | |
|---|---|---|---|---|---|---|---|---|---|
| 1040-1059 | 526 | 1485 | 527 | 1484 | 528 | 1483 | 529 | 1482 | 530 | 1481 |
| 1060-1079 | 536 | 1475 | 537 | 1474 | 538 | 1473 | 539 | 1472 | 540 | 1471 |
| 1080-1099 | 546 | 1465 | 547 | 1464 | 548 | 1463 | 549 | 1462 | 550 | 1461 |
| 1100-1119 | 556 | 1455 | 557 | 1454 | 558 | 1453 | 559 | 1452 | 560 | 1451 |
| 1120-1139 | 566 | 1445 | 567 | 1444 | 568 | 1443 | 569 | 1442 | 570 | 1441 |
| 1140-1159 | 576 | 1435 | 577 | 1434 | 578 | 1433 | 579 | 1432 | 580 | 1431 |
| 1160-1179 | 586 | 1425 | 587 | 1424 | 588 | 1423 | 589 | 1422 | 590 | 1421 |
| 1180-1199 | 596 | 1415 | 597 | 1414 | 598 | 1413 | 599 | 1412 | 600 | 1411 |
| 1200-1219 | 606 | 1405 | 607 | 1404 | 608 | 1403 | 609 | 1402 | 610 | 1401 |
| 1220-1239 | 616 | 1395 | 617 | 1394 | 618 | 1393 | 619 | 1392 | 620 | 1391 |
| 1240-1259 | 626 | 1385 | 627 | 1384 | 628 | 1383 | 629 | 1382 | 630 | 1381 |
| 1260-1279 | 636 | 1375 | 637 | 1374 | 638 | 1373 | 639 | 1372 | 640 | 1371 |
| 1280-1299 | 646 | 1365 | 647 | 1364 | 648 | 1363 | 649 | 1362 | 650 | 1361 |
| 1300-1319 | 656 | 1355 | 657 | 1354 | 658 | 1353 | 659 | 1352 | 660 | 1351 |
| 1320-1339 | 666 | 1345 | 667 | 1344 | 668 | 1343 | 669 | 1342 | 670 | 1341 |
| 1340-1359 | 676 | 1335 | 677 | 1334 | 678 | 1333 | 679 | 1332 | 680 | 1331 |
| 1360-1379 | 686 | 1325 | 687 | 1324 | 688 | 1323 | 689 | 1322 | 690 | 1321 |
| 1380-1399 | 696 | 1315 | 697 | 1314 | 698 | 1313 | 699 | 1312 | 700 | 1311 |
| 1400-1419 | 706 | 1305 | 707 | 1304 | 708 | 1303 | 709 | 1302 | 710 | 1301 |
| 1420-1439 | 716 | 1295 | 717 | 1294 | 718 | 1293 | 719 | 1292 | 720 | 1291 |
| 1440-1459 | 726 | 1285 | 727 | 1284 | 728 | 1283 | 729 | 1282 | 730 | 1281 |
| 1460-1479 | 736 | 1275 | 737 | 1274 | 738 | 1273 | 739 | 1272 | 740 | 1271 |
| 1480-1499 | 746 | 1265 | 747 | 1264 | 748 | 1263 | 749 | 1262 | 750 | 1261 |
| 1500-1519 | 756 | 1255 | 757 | 1254 | 758 | 1253 | 759 | 1252 | 760 | 1251 |
| 1520-1539 | 766 | 1245 | 767 | 1244 | 768 | 1243 | 769 | 1242 | 770 | 1241 |
| 1540-1559 | 776 | 1235 | 777 | 1234 | 778 | 1233 | 779 | 1232 | 780 | 1231 |
| 1560-1579 | 786 | 1225 | 787 | 1224 | 788 | 1223 | 789 | 1222 | 790 | 1221 |
| 1580-1599 | 796 | 1215 | 797 | 1214 | 798 | 1213 | 799 | 1212 | 800 | 1211 |
| 1600-1619 | 806 | 1205 | 807 | 1204 | 808 | 1203 | 809 | 1202 | 810 | 1201 |
| 1620-1639 | 816 | 1195 | 817 | 1194 | 818 | 1193 | 819 | 1192 | 820 | 1191 |
| 1640-1659 | 826 | 1185 | 827 | 1184 | 828 | 1183 | 829 | 1182 | 830 | 1181 |
| 1660-1679 | 836 | 1175 | 837 | 1174 | 838 | 1173 | 839 | 1172 | 840 | 1171 |
| 1680-1699 | 846 | 1165 | 847 | 1164 | 848 | 1163 | 849 | 1162 | 850 | 1161 |
| 1700-1719 | 856 | 1155 | 857 | 1154 | 858 | 1153 | 859 | 1152 | 860 | 1151 |
| 1720-1739 | 866 | 1145 | 867 | 1144 | 868 | 1143 | 869 | 1142 | 870 | 1141 |
| 1740-1759 | 876 | 1135 | 877 | 1134 | 878 | 1133 | 879 | 1132 | 880 | 1131 |
| 1760-1779 | 886 | 1125 | 887 | 1124 | 888 | 1123 | 889 | 1122 | 890 | 1121 |
| 1780-1799 | 896 | 1115 | 897 | 1114 | 898 | 1113 | 899 | 1112 | 900 | 1111 |
| 1800-1819 | 906 | 1105 | 907 | 1104 | 908 | 1103 | 909 | 1102 | 910 | 1101 |
| 1820-1839 | 916 | 1095 | 917 | 1094 | 918 | 1093 | 919 | 1092 | 920 | 1091 |
| 1840-1859 | 926 | 1085 | 927 | 1084 | 928 | 1083 | 929 | 1082 | 930 | 1081 |
| 1860-1879 | 936 | 1075 | 937 | 1074 | 938 | 1073 | 939 | 1072 | 940 | 1071 |
| 1880-1899 | 946 | 1065 | 947 | 1064 | 948 | 1063 | 949 | 1062 | 950 | 1061 |
| 1900-1919 | 956 | 1055 | 957 | 1054 | 958 | 1053 | 959 | 1052 | 960 | 1051 |
| 1920-1939 | 966 | 1045 | 967 | 1044 | 968 | 1043 | 969 | 1042 | 970 | 1041 |
| 1940-1959 | 976 | 1035 | 977 | 1034 | 978 | 1033 | 979 | 1032 | 980 | 1031 |
| 1960-1979 | 986 | 1025 | 987 | 1024 | 988 | 1023 | 989 | 1022 | 990 | 1021 |
| 1980-1999 | 996 | 1015 | 997 | 1014 | 998 | 1013 | 999 | 1012 | 1000 | 1011 |
| 2000-2009 | — | — | — | — | — | — | — | — | — |

For another example, the mapping between logical root index i and the sequence number u for $L_{RA}=2087$ is shown in TABLE 2C-1 and TABLE 2C-2.

TABLE 2C-1

Example mapping between logical root index i and the sequence number u for $L_{RA} = 2087$.

| i | sequence number u in increasing order of logical root index i | | | | | | | | |
|---|---|---|---|---|---|---|---|---|---|
| 0-19 | 1 | 2086 | 2 | 2085 | 3 | 2084 | 4 | 2083 | 5 | 2082 |
| 20-39 | 11 | 2076 | 12 | 2075 | 13 | 2074 | 14 | 2073 | 15 | 2072 |
| 40-59 | 21 | 2066 | 22 | 2065 | 23 | 2064 | 24 | 2063 | 25 | 2062 |
| 60-79 | 31 | 2056 | 32 | 2055 | 33 | 2054 | 34 | 2053 | 35 | 2052 |
| 80-99 | 41 | 2046 | 42 | 2045 | 43 | 2044 | 44 | 2043 | 45 | 2042 |
| 100-119 | 51 | 2036 | 52 | 2035 | 53 | 2034 | 54 | 2033 | 55 | 2032 |
| 120-139 | 61 | 2026 | 62 | 2025 | 63 | 2024 | 64 | 2023 | 65 | 2022 |
| 140-159 | 71 | 2016 | 72 | 2015 | 73 | 2014 | 74 | 2013 | 75 | 2012 |
| 160-179 | 81 | 2006 | 82 | 2005 | 83 | 2004 | 84 | 2003 | 85 | 2002 |
| 180-199 | 91 | 1996 | 92 | 1995 | 93 | 1994 | 94 | 1993 | 95 | 1992 |
| 200-219 | 101 | 1986 | 102 | 1985 | 103 | 1984 | 104 | 1983 | 105 | 1982 |
| 220-239 | 111 | 1976 | 112 | 1975 | 113 | 1974 | 114 | 1973 | 115 | 1972 |
| 240-259 | 121 | 1966 | 122 | 1965 | 123 | 1964 | 124 | 1963 | 125 | 1962 |

TABLE 2C-1-continued

Example mapping between logical root index i and the sequence number u for $L_{RA} = 2087$.

| i | sequence number u in increasing order of logical root index i | | | | | | | | |
|---|---|---|---|---|---|---|---|---|---|
| 260-279 | 131 | 1956 | 132 | 1955 | 133 | 1954 | 134 | 1953 | 135 | 1952 |
| 280-299 | 141 | 1946 | 142 | 1945 | 143 | 1944 | 144 | 1943 | 145 | 1942 |
| 300-319 | 151 | 1936 | 152 | 1935 | 153 | 1934 | 154 | 1933 | 155 | 1932 |
| 320-339 | 161 | 1926 | 162 | 1925 | 163 | 1924 | 164 | 1923 | 165 | 1922 |
| 340-359 | 171 | 1916 | 172 | 1915 | 173 | 1914 | 174 | 1913 | 175 | 1912 |
| 360-379 | 181 | 1906 | 182 | 1905 | 183 | 1904 | 184 | 1903 | 185 | 1902 |
| 380-399 | 191 | 1896 | 192 | 1895 | 193 | 1894 | 194 | 1893 | 195 | 1892 |
| 400-419 | 201 | 1886 | 202 | 1885 | 203 | 1884 | 204 | 1883 | 205 | 1882 |
| 420-439 | 211 | 1876 | 212 | 1875 | 213 | 1874 | 214 | 1873 | 215 | 1872 |
| 440-459 | 221 | 1866 | 222 | 1865 | 223 | 1864 | 224 | 1863 | 225 | 1862 |
| 460-479 | 231 | 1856 | 232 | 1855 | 233 | 1854 | 234 | 1853 | 235 | 1852 |
| 480-499 | 241 | 1846 | 242 | 1845 | 243 | 1844 | 244 | 1843 | 245 | 1842 |
| 500-519 | 251 | 1836 | 252 | 1835 | 253 | 1834 | 254 | 1833 | 255 | 1832 |
| 520-539 | 261 | 1826 | 262 | 1825 | 263 | 1824 | 264 | 1823 | 265 | 1822 |
| 540-559 | 271 | 1816 | 272 | 1815 | 273 | 1814 | 274 | 1813 | 275 | 1812 |
| 560-579 | 281 | 1806 | 282 | 1805 | 283 | 1804 | 284 | 1803 | 285 | 1802 |
| 580-599 | 291 | 1796 | 292 | 1795 | 293 | 1794 | 294 | 1793 | 295 | 1792 |
| 600-619 | 301 | 1786 | 302 | 1785 | 303 | 1784 | 304 | 1783 | 305 | 1782 |
| 620-639 | 311 | 1776 | 312 | 1775 | 313 | 1774 | 314 | 1773 | 315 | 1772 |
| 640-659 | 321 | 1766 | 322 | 1765 | 323 | 1764 | 324 | 1763 | 325 | 1762 |
| 660-679 | 331 | 1756 | 332 | 1755 | 333 | 1754 | 334 | 1753 | 335 | 1752 |
| 680-699 | 341 | 1746 | 342 | 1745 | 343 | 1744 | 344 | 1743 | 345 | 1742 |
| 700-719 | 351 | 1736 | 352 | 1735 | 353 | 1734 | 354 | 1733 | 355 | 1732 |
| 720-739 | 361 | 1726 | 362 | 1725 | 363 | 1724 | 364 | 1723 | 365 | 1722 |
| 740-759 | 371 | 1716 | 372 | 1715 | 373 | 1714 | 374 | 1713 | 375 | 1712 |
| 760-779 | 381 | 1706 | 382 | 1705 | 383 | 1704 | 384 | 1703 | 385 | 1702 |
| 780-799 | 391 | 1696 | 392 | 1695 | 393 | 1694 | 394 | 1693 | 395 | 1692 |
| 800-819 | 401 | 1686 | 402 | 1685 | 403 | 1684 | 404 | 1683 | 405 | 1682 |
| 820-839 | 411 | 1676 | 412 | 1675 | 413 | 1674 | 414 | 1673 | 415 | 1672 |
| 840-859 | 421 | 1666 | 422 | 1665 | 423 | 1664 | 424 | 1663 | 425 | 1662 |
| 860-879 | 431 | 1656 | 432 | 1655 | 433 | 1654 | 434 | 1653 | 435 | 1652 |
| 880-899 | 441 | 1646 | 442 | 1645 | 443 | 1644 | 444 | 1643 | 445 | 1642 |
| 900-919 | 451 | 1636 | 452 | 1635 | 453 | 1634 | 454 | 1633 | 455 | 1632 |
| 920-939 | 461 | 1626 | 462 | 1625 | 463 | 1624 | 464 | 1623 | 465 | 1622 |
| 940-959 | 471 | 1616 | 472 | 1615 | 473 | 1614 | 474 | 1613 | 475 | 1612 |
| 960-979 | 481 | 1606 | 482 | 1605 | 483 | 1604 | 484 | 1603 | 485 | 1602 |
| 980-999 | 491 | 1596 | 492 | 1595 | 493 | 1594 | 494 | 1593 | 495 | 1592 |
| 1000-1019 | 501 | 1586 | 502 | 1585 | 503 | 1584 | 504 | 1583 | 505 | 1582 |
| 1020-1039 | 511 | 1576 | 512 | 1575 | 513 | 1574 | 514 | 1573 | 515 | 1572 |
| 1040-1059 | 521 | 1566 | 522 | 1565 | 523 | 1564 | 524 | 1563 | 525 | 1562 |
| 1060-1079 | 531 | 1556 | 532 | 1555 | 533 | 1554 | 534 | 1553 | 535 | 1552 |
| 1080-1099 | 541 | 1546 | 542 | 1545 | 543 | 1544 | 544 | 1543 | 545 | 1542 |
| 1100-1119 | 551 | 1536 | 552 | 1535 | 553 | 1534 | 554 | 1533 | 555 | 1532 |
| 1120-1139 | 561 | 1526 | 562 | 1525 | 563 | 1524 | 564 | 1523 | 565 | 1522 |
| 1140-1159 | 571 | 1516 | 572 | 1515 | 573 | 1514 | 574 | 1513 | 575 | 1512 |
| 1160-1179 | 581 | 1506 | 582 | 1505 | 583 | 1504 | 584 | 1503 | 585 | 1502 |
| 1180-1199 | 591 | 1496 | 592 | 1495 | 593 | 1494 | 594 | 1493 | 595 | 1492 |
| 1200-1219 | 601 | 1486 | 602 | 1485 | 603 | 1484 | 604 | 1483 | 605 | 1482 |
| 1220-1239 | 611 | 1476 | 612 | 1475 | 613 | 1474 | 614 | 1473 | 615 | 1472 |
| 1240-1259 | 621 | 1466 | 622 | 1465 | 623 | 1464 | 624 | 1463 | 625 | 1462 |
| 1260-1279 | 631 | 1456 | 632 | 1455 | 633 | 1454 | 634 | 1453 | 635 | 1452 |
| 1280-1299 | 641 | 1446 | 642 | 1445 | 643 | 1444 | 644 | 1443 | 645 | 1442 |
| 1300-1319 | 651 | 1436 | 652 | 1435 | 653 | 1434 | 654 | 1433 | 655 | 1432 |
| 1320-1339 | 661 | 1426 | 662 | 1425 | 663 | 1424 | 664 | 1423 | 665 | 1422 |
| 1340-1359 | 671 | 1416 | 672 | 1415 | 673 | 1414 | 674 | 1413 | 675 | 1412 |
| 1360-1379 | 681 | 1406 | 682 | 1405 | 683 | 1404 | 684 | 1403 | 685 | 1402 |
| 1380-1399 | 691 | 1396 | 692 | 1395 | 693 | 1394 | 694 | 1393 | 695 | 1392 |
| 1400-1419 | 701 | 1386 | 702 | 1385 | 703 | 1384 | 704 | 1383 | 705 | 1382 |
| 1420-1439 | 711 | 1376 | 712 | 1375 | 713 | 1374 | 714 | 1373 | 715 | 1372 |
| 1440-1459 | 721 | 1366 | 722 | 1365 | 723 | 1364 | 724 | 1363 | 725 | 1362 |
| 1460-1479 | 731 | 1356 | 732 | 1355 | 733 | 1354 | 734 | 1353 | 735 | 1352 |
| 1480-1499 | 741 | 1346 | 742 | 1345 | 743 | 1344 | 744 | 1343 | 745 | 1342 |
| 1500-1519 | 751 | 1336 | 752 | 1335 | 753 | 1334 | 754 | 1333 | 755 | 1332 |
| 1520-1539 | 761 | 1326 | 762 | 1325 | 763 | 1324 | 764 | 1323 | 765 | 1322 |
| 1540-1559 | 771 | 1316 | 772 | 1315 | 773 | 1314 | 774 | 1313 | 775 | 1312 |
| 1560-1579 | 781 | 1306 | 782 | 1305 | 783 | 1304 | 784 | 1303 | 785 | 1302 |
| 1580-1599 | 791 | 1296 | 792 | 1295 | 793 | 1294 | 794 | 1293 | 795 | 1292 |
| 1600-1619 | 801 | 1286 | 802 | 1285 | 803 | 1284 | 804 | 1283 | 805 | 1282 |
| 1620-1639 | 811 | 1276 | 812 | 1275 | 813 | 1274 | 814 | 1273 | 815 | 1272 |
| 1640-1659 | 821 | 1266 | 822 | 1265 | 823 | 1264 | 824 | 1263 | 825 | 1262 |
| 1660-1679 | 831 | 1256 | 832 | 1255 | 833 | 1254 | 834 | 1253 | 835 | 1252 |
| 1680-1699 | 841 | 1246 | 842 | 1245 | 843 | 1244 | 844 | 1243 | 845 | 1242 |
| 1700-1719 | 851 | 1236 | 852 | 1235 | 853 | 1234 | 854 | 1233 | 855 | 1232 |
| 1720-1739 | 861 | 1226 | 862 | 1225 | 863 | 1224 | 864 | 1223 | 865 | 1222 |
| 1740-1759 | 871 | 1216 | 872 | 1215 | 873 | 1214 | 874 | 1213 | 875 | 1212 |
| 1760-1779 | 881 | 1206 | 882 | 1205 | 883 | 1204 | 884 | 1203 | 885 | 1202 |

TABLE 2C-1-continued

Example mapping between logical root index i and the sequence number u for $L_{RA} = 2087$.

| i | sequence number u in increasing order of logical root index i | | | | | | | | |
|---|---|---|---|---|---|---|---|---|---|
| 1780-1799 | 891 | 1196 | 892 | 1195 | 893 | 1194 | 894 | 1193 | 895 | 1192 |
| 1800-1819 | 901 | 1186 | 902 | 1185 | 903 | 1184 | 904 | 1183 | 905 | 1182 |
| 1820-1839 | 911 | 1176 | 912 | 1175 | 913 | 1174 | 914 | 1173 | 915 | 1172 |
| 1840-1859 | 921 | 1166 | 922 | 1165 | 923 | 1164 | 924 | 1163 | 925 | 1162 |
| 1860-1879 | 931 | 1156 | 932 | 1155 | 933 | 1154 | 934 | 1153 | 935 | 1152 |
| 1880-1899 | 941 | 1146 | 942 | 1145 | 943 | 1144 | 944 | 1143 | 945 | 1142 |
| 1900-1919 | 951 | 1136 | 952 | 1135 | 953 | 1134 | 954 | 1133 | 955 | 1132 |
| 1920-1939 | 961 | 1126 | 962 | 1125 | 963 | 1124 | 964 | 1123 | 965 | 1122 |
| 1940-1959 | 971 | 1116 | 972 | 1115 | 973 | 1114 | 974 | 1113 | 975 | 1112 |
| 1960-1979 | 981 | 1106 | 982 | 1105 | 983 | 1104 | 984 | 1103 | 985 | 1102 |
| 1980-1999 | 991 | 1096 | 992 | 1095 | 993 | 1094 | 994 | 1093 | 995 | 1092 |
| 2000-2019 | 1001 | 1086 | 1002 | 1085 | 1003 | 1084 | 1004 | 1083 | 1005 | 1082 |
| 2020-2039 | 1011 | 1076 | 1012 | 1075 | 1013 | 1074 | 1014 | 1073 | 1015 | 1072 |
| 2040-2059 | 1021 | 1066 | 1022 | 1065 | 1023 | 1064 | 1024 | 1063 | 1025 | 1062 |
| 2060-2079 | 1031 | 1056 | 1032 | 1055 | 1033 | 1054 | 1034 | 1053 | 1035 | 1052 |
| 2080-2085 | 1041 | 1046 | 1042 | 1045 | 1043 | 1044 | — | — | — | — |

TABLE 2C-2

Example mapping between logical root index i and the sequence number u for $L_{RA} = 2087$.

| i | sequence number u in increasing order of logical root index i | | | | | | | | |
|---|---|---|---|---|---|---|---|---|---|
| 0-19 | 6 | 2081 | 7 | 2080 | 8 | 2079 | 9 | 2078 | 10 | 2077 |
| 20-39 | 16 | 2071 | 17 | 2070 | 18 | 2069 | 19 | 2068 | 20 | 2067 |
| 40-59 | 26 | 2061 | 27 | 2060 | 28 | 2059 | 29 | 2058 | 30 | 2057 |
| 60-79 | 36 | 2051 | 37 | 2050 | 38 | 2049 | 39 | 2048 | 40 | 2047 |
| 80-99 | 46 | 2041 | 47 | 2040 | 48 | 2039 | 49 | 2038 | 50 | 2037 |
| 100-119 | 56 | 2031 | 57 | 2030 | 58 | 2029 | 59 | 2028 | 60 | 2027 |
| 120-139 | 66 | 2021 | 67 | 2020 | 68 | 2019 | 69 | 2018 | 70 | 2017 |
| 140-159 | 76 | 2011 | 77 | 2010 | 78 | 2009 | 79 | 2008 | 80 | 2007 |
| 160-179 | 86 | 2001 | 87 | 2000 | 88 | 1999 | 89 | 1998 | 90 | 1997 |
| 180-199 | 96 | 1991 | 97 | 1990 | 98 | 1989 | 99 | 1988 | 100 | 1987 |
| 200-219 | 106 | 1981 | 107 | 1980 | 108 | 1979 | 109 | 1978 | 110 | 1977 |
| 220-239 | 116 | 1971 | 117 | 1970 | 118 | 1969 | 119 | 1968 | 120 | 1967 |
| 240-259 | 126 | 1961 | 127 | 1960 | 128 | 1959 | 129 | 1958 | 130 | 1957 |
| 260-279 | 136 | 1951 | 137 | 1950 | 138 | 1949 | 139 | 1948 | 140 | 1947 |
| 280-299 | 146 | 1941 | 147 | 1940 | 148 | 1939 | 149 | 1938 | 150 | 1937 |
| 300-319 | 156 | 1931 | 157 | 1930 | 158 | 1929 | 159 | 1928 | 160 | 1927 |
| 320-339 | 166 | 1921 | 167 | 1920 | 168 | 1919 | 169 | 1918 | 170 | 1917 |
| 340-359 | 176 | 1911 | 177 | 1910 | 178 | 1909 | 179 | 1908 | 180 | 1907 |
| 360-379 | 186 | 1901 | 187 | 1900 | 188 | 1899 | 189 | 1898 | 190 | 1897 |
| 380-399 | 196 | 1891 | 197 | 1890 | 198 | 1889 | 199 | 1888 | 200 | 1887 |
| 400-419 | 206 | 1881 | 207 | 1880 | 208 | 1879 | 209 | 1878 | 210 | 1877 |
| 420-439 | 216 | 1871 | 217 | 1870 | 218 | 1869 | 219 | 1868 | 220 | 1867 |
| 440-459 | 226 | 1861 | 227 | 1860 | 228 | 1859 | 229 | 1858 | 230 | 1857 |
| 460-479 | 236 | 1851 | 237 | 1850 | 238 | 1849 | 239 | 1848 | 240 | 1847 |
| 480-499 | 246 | 1841 | 247 | 1840 | 248 | 1839 | 249 | 1838 | 250 | 1837 |
| 500-519 | 256 | 1831 | 257 | 1830 | 258 | 1829 | 259 | 1828 | 260 | 1827 |
| 520-539 | 266 | 1821 | 267 | 1820 | 268 | 1819 | 269 | 1818 | 270 | 1817 |
| 540-559 | 276 | 1811 | 277 | 1810 | 278 | 1809 | 279 | 1808 | 280 | 1807 |
| 560-579 | 286 | 1801 | 287 | 1800 | 288 | 1799 | 289 | 1798 | 290 | 1797 |
| 580-599 | 296 | 1791 | 297 | 1790 | 298 | 1789 | 299 | 1788 | 300 | 1787 |
| 600-619 | 306 | 1781 | 307 | 1780 | 308 | 1779 | 309 | 1778 | 310 | 1777 |
| 620-639 | 316 | 1771 | 317 | 1770 | 318 | 1769 | 319 | 1768 | 320 | 1767 |
| 640-659 | 326 | 1761 | 327 | 1760 | 328 | 1759 | 329 | 1758 | 330 | 1757 |
| 660-679 | 336 | 1751 | 337 | 1750 | 338 | 1749 | 339 | 1748 | 340 | 1747 |
| 680-699 | 346 | 1741 | 347 | 1740 | 348 | 1739 | 349 | 1738 | 350 | 1737 |
| 700-719 | 356 | 1731 | 357 | 1730 | 358 | 1729 | 359 | 1728 | 360 | 1727 |
| 720-739 | 366 | 1721 | 367 | 1720 | 368 | 1719 | 369 | 1718 | 370 | 1717 |
| 740-759 | 376 | 1711 | 377 | 1710 | 378 | 1709 | 379 | 1708 | 380 | 1707 |
| 760-779 | 386 | 1701 | 387 | 1700 | 388 | 1699 | 389 | 1698 | 390 | 1697 |
| 780-799 | 396 | 1691 | 397 | 1690 | 398 | 1689 | 399 | 1688 | 400 | 1687 |
| 800-819 | 406 | 1681 | 407 | 1680 | 408 | 1679 | 409 | 1678 | 410 | 1677 |
| 820-839 | 416 | 1671 | 417 | 1670 | 418 | 1669 | 419 | 1668 | 420 | 1667 |
| 840-859 | 426 | 1661 | 427 | 1660 | 428 | 1659 | 429 | 1658 | 430 | 1657 |
| 860-879 | 436 | 1651 | 437 | 1650 | 438 | 1649 | 439 | 1648 | 440 | 1647 |
| 880-899 | 446 | 1641 | 447 | 1640 | 448 | 1639 | 449 | 1638 | 450 | 1637 |
| 900-919 | 456 | 1631 | 457 | 1630 | 458 | 1629 | 459 | 1628 | 460 | 1627 |
| 920-939 | 466 | 1621 | 467 | 1620 | 468 | 1619 | 469 | 1618 | 470 | 1617 |
| 940-959 | 476 | 1611 | 477 | 1610 | 478 | 1609 | 479 | 1608 | 480 | 1607 |
| 960-979 | 486 | 1601 | 487 | 1600 | 488 | 1599 | 489 | 1598 | 490 | 1597 |
| 980-999 | 496 | 1591 | 497 | 1590 | 498 | 1589 | 499 | 1588 | 500 | 1587 |

TABLE 2C-2-continued

Example mapping between logical root index i and the sequence number u for $L_{RA} = 2087$.

| i | sequence number u in increasing order of logical root index i | | | | | | | | |
|---|---|---|---|---|---|---|---|---|---|
| 1000-1019 | 506 | 1581 | 507 | 1580 | 508 | 1579 | 509 | 1578 | 510 | 1577 |
| 1020-1039 | 516 | 1571 | 517 | 1570 | 518 | 1569 | 519 | 1568 | 520 | 1567 |
| 1040-1059 | 526 | 1561 | 527 | 1560 | 528 | 1559 | 529 | 1558 | 530 | 1557 |
| 1060-1079 | 536 | 1551 | 537 | 1550 | 538 | 1549 | 539 | 1548 | 540 | 1547 |
| 1080-1099 | 546 | 1541 | 547 | 1540 | 548 | 1539 | 549 | 1538 | 550 | 1537 |
| 1100-1119 | 556 | 1531 | 557 | 1530 | 558 | 1529 | 559 | 1528 | 560 | 1527 |
| 1120-1139 | 566 | 1521 | 567 | 1520 | 568 | 1519 | 569 | 1518 | 570 | 1517 |
| 1140-1159 | 576 | 1511 | 577 | 1510 | 578 | 1509 | 579 | 1508 | 580 | 1507 |
| 1160-1179 | 586 | 1501 | 587 | 1500 | 588 | 1499 | 589 | 1498 | 590 | 1497 |
| 1180-1199 | 596 | 1491 | 597 | 1490 | 598 | 1489 | 599 | 1488 | 600 | 1487 |
| 1200-1219 | 606 | 1481 | 607 | 1480 | 608 | 1479 | 609 | 1478 | 610 | 1477 |
| 1220-1239 | 616 | 1471 | 617 | 1470 | 618 | 1469 | 619 | 1468 | 620 | 1467 |
| 1240-1259 | 626 | 1461 | 627 | 1460 | 628 | 1459 | 629 | 1458 | 630 | 1457 |
| 1260-1279 | 636 | 1451 | 637 | 1450 | 638 | 1449 | 639 | 1448 | 640 | 1447 |
| 1280-1299 | 646 | 1441 | 647 | 1440 | 648 | 1439 | 649 | 1438 | 650 | 1437 |
| 1300-1319 | 656 | 1431 | 657 | 1430 | 658 | 1429 | 659 | 1428 | 660 | 1427 |
| 1320-1339 | 666 | 1421 | 667 | 1420 | 668 | 1419 | 669 | 1418 | 670 | 1417 |
| 1340-1359 | 676 | 1411 | 677 | 1410 | 678 | 1409 | 679 | 1408 | 680 | 1407 |
| 1360-1379 | 686 | 1401 | 687 | 1400 | 688 | 1399 | 689 | 1398 | 690 | 1397 |
| 1380-1399 | 696 | 1391 | 697 | 1390 | 698 | 1389 | 699 | 1388 | 700 | 1387 |
| 1400-1419 | 706 | 1381 | 707 | 1380 | 708 | 1379 | 709 | 1378 | 710 | 1377 |
| 1420-1439 | 716 | 1371 | 717 | 1370 | 718 | 1369 | 719 | 1368 | 720 | 1367 |
| 1440-1459 | 726 | 1361 | 727 | 1360 | 728 | 1359 | 729 | 1358 | 730 | 1357 |
| 1460-1479 | 736 | 1351 | 737 | 1350 | 738 | 1349 | 739 | 1348 | 740 | 1347 |
| 1480-1499 | 746 | 1341 | 747 | 1340 | 748 | 1339 | 749 | 1338 | 750 | 1337 |
| 1500-1519 | 756 | 1331 | 757 | 1330 | 758 | 1329 | 759 | 1328 | 760 | 1327 |
| 1520-1539 | 766 | 1321 | 767 | 1320 | 768 | 1319 | 769 | 1318 | 770 | 1317 |
| 1540-1559 | 776 | 1311 | 777 | 1310 | 778 | 1309 | 779 | 1308 | 780 | 1307 |
| 1560-1579 | 786 | 1301 | 787 | 1300 | 788 | 1299 | 789 | 1298 | 790 | 1297 |
| 1580-1599 | 796 | 1291 | 797 | 1290 | 798 | 1289 | 799 | 1288 | 800 | 1287 |
| 1600-1619 | 806 | 1281 | 807 | 1280 | 808 | 1279 | 809 | 1278 | 810 | 1277 |
| 1620-1639 | 816 | 1271 | 817 | 1270 | 818 | 1269 | 819 | 1268 | 820 | 1267 |
| 1640-1659 | 826 | 1261 | 827 | 1260 | 828 | 1259 | 829 | 1258 | 830 | 1257 |
| 1660-1679 | 836 | 1251 | 837 | 1250 | 838 | 1249 | 839 | 1248 | 840 | 1247 |
| 1680-1699 | 846 | 1241 | 847 | 1240 | 848 | 1239 | 849 | 1238 | 850 | 1237 |
| 1700-1719 | 856 | 1231 | 857 | 1230 | 858 | 1229 | 859 | 1228 | 860 | 1227 |
| 1720-1739 | 866 | 1221 | 867 | 1220 | 868 | 1219 | 869 | 1218 | 870 | 1217 |
| 1740-1759 | 876 | 1211 | 877 | 1210 | 878 | 1209 | 879 | 1208 | 880 | 1207 |
| 1760-1779 | 886 | 1201 | 887 | 1200 | 888 | 1199 | 889 | 1198 | 890 | 1197 |
| 1780-1799 | 896 | 1191 | 897 | 1190 | 898 | 1189 | 899 | 1188 | 900 | 1187 |
| 1800-1819 | 906 | 1181 | 907 | 1180 | 908 | 1179 | 909 | 1178 | 910 | 1177 |
| 1820-1839 | 916 | 1171 | 917 | 1170 | 918 | 1169 | 919 | 1168 | 920 | 1167 |
| 1840-1859 | 926 | 1161 | 927 | 1160 | 928 | 1159 | 929 | 1158 | 930 | 1157 |
| 1860-1879 | 936 | 1151 | 937 | 1150 | 938 | 1149 | 939 | 1148 | 940 | 1147 |
| 1880-1899 | 946 | 1141 | 947 | 1140 | 948 | 1139 | 949 | 1138 | 950 | 1137 |
| 1900-1919 | 956 | 1131 | 957 | 1130 | 958 | 1129 | 959 | 1128 | 960 | 1127 |
| 1920-1939 | 966 | 1121 | 967 | 1120 | 968 | 1119 | 969 | 1118 | 970 | 1117 |
| 1940-1959 | 976 | 1111 | 977 | 1110 | 978 | 1109 | 979 | 1108 | 980 | 1107 |
| 1960-1979 | 986 | 1101 | 987 | 1100 | 988 | 1099 | 989 | 1098 | 990 | 1097 |
| 1980-1999 | 996 | 1091 | 997 | 1090 | 998 | 1089 | 999 | 1088 | 1000 | 1087 |
| 2000-2019 | 1006 | 1081 | 1007 | 1080 | 1008 | 1079 | 1009 | 1078 | 1010 | 1077 |
| 2020-2039 | 1016 | 1071 | 1017 | 1070 | 1018 | 1069 | 1019 | 1068 | 1020 | 1067 |
| 2040-2059 | 1026 | 1061 | 1027 | 1060 | 1028 | 1059 | 1029 | 1058 | 1030 | 1057 |
| 2060-2079 | 1036 | 1051 | 1037 | 1050 | 1038 | 1049 | 1039 | 1048 | 1040 | 1047 |
| 2080-2085 | — | — | — | — | — | — | — | — | — |

In one embodiment, for a new PRACH preamble sequence length, the cyclic shift design is enhanced accordingly, wherein the cyclic shift is derived from a higher layer parameter (zeroCorrelationZoneConfig).

For one example, for a given preamble sequence length $L_{RA}=1583$, the corresponding cyclic shift $N_{CS}$ can be selected from one of the examples in TABLE 3A.

TABLE 3A

Example cyclic shift mapping for $L_{RA} = 1583$.

| zeroCorrelationZoneConfig | Example # | | | | | | | | | |
| | 1 | 2 | 3 | 4 | 5 | 6 | 7 | 8 | 9 | 10 |
|---|---|---|---|---|---|---|---|---|---|---|
| | $N_{CS}$ | $N_{CS}$ | $N_{CS}$ | $N_{CS}$ | $N_{CS}$ | $N_{CS}$ | $N_{CS}$ | $N_{CS}$ | $N_{CS}$ | $N_{CS}$ |
| 0 | 0 | 0 | 0 | 0 | 0 | 0 | 0 | 0 | 0 | 0 |
| 1 | 24 | 23 | 22 | 23 | 25 | 24 | 25 | 25 | 24 | 25 |
| 2 | 29 | 46 | 45 | 46 | 29 | 28 | 28 | 50 | 49 | 49 |

TABLE 3A-continued

Example cyclic shift mapping for $L_{RA} = 1583$.

| | Example # | | | | | | | | | |
|---|---|---|---|---|---|---|---|---|---|---|
| | 1 | 2 | 3 | 4 | 5 | 6 | 7 | 8 | 9 | 10 |
| 3 | 35 | 69 | 68 | 68 | 34 | 33 | 34 | 63 | 62 | 62 |
| 4 | 41 | 92 | 91 | 91 | 42 | 41 | 42 | 72 | 71 | 72 |
| 5 | 49 | 114 | 113 | 114 | 50 | 49 | 49 | 78 | 77 | 77 |
| 6 | 60 | 137 | 136 | 137 | 61 | 60 | 60 | 93 | 92 | 92 |
| 7 | 71 | 149 | 148 | 148 | 72 | 71 | 72 | 104 | 103 | 104 |
| 8 | 87 | 171 | 170 | 171 | 87 | 86 | 87 | 121 | 120 | 121 |
| 9 | 113 | 194 | 193 | 194 | 112 | 111 | 111 | 144 | 143 | 143 |
| 10 | 143 | 217 | 216 | 216 | 144 | 143 | 143 | 176 | 175 | 175 |
| 11 | 175 | 262 | 261 | 262 | 176 | 175 | 175 | 225 | 224 | 225 |
| 12 | 226 | 308 | 307 | 307 | 225 | 224 | 225 | 263 | 262 | 262 |
| 13 | 316 | 388 | 387 | 387 | 316 | 315 | 315 | 395 | 394 | 394 |
| 14 | 527 | 524 | 523 | 524 | 527 | 526 | 526 | 527 | 526 | 526 |
| 15 | 791 | 786 | 785 | 786 | 791 | 790 | 791 | 791 | 790 | 791 |

For one example, for a given preamble sequence length $L_{RA}=2011$, the corresponding cyclic shift $N_{CS}$ can be selected from one of the examples in TABLE 3B.

TABLE 3B

Example cyclic shift mapping for $L_{RA} = 2011$.

| | Example # | | | | | | | | | |
|---|---|---|---|---|---|---|---|---|---|---|
| | 1 | 2 | 3 | 4 | 5 | 6 | 7 | 8 | 9 | 10 |
| zeroCorrelationZoneConfig | $N_{CS}$ | $N_{CS}$ | $N_{CS}$ | $N_{CS}$ | $N_{CS}$ | $N_{CS}$ | $N_{CS}$ | $N_{CS}$ | $N_{CS}$ | $N_{CS}$ |
| 0 | 0 | 0 | 0 | 0 | 0 | 0 | 0 | 0 | 0 | 0 |
| 1 | 31 | 29 | 28 | 29 | 32 | 31 | 31 | 32 | 31 | 31 |
| 2 | 37 | 58 | 57 | 58 | 36 | 35 | 36 | 63 | 62 | 62 |
| 3 | 44 | 87 | 86 | 87 | 44 | 43 | 43 | 80 | 79 | 79 |
| 4 | 52 | 116 | 115 | 116 | 53 | 52 | 53 | 92 | 91 | 91 |
| 5 | 62 | 145 | 144 | 145 | 63 | 62 | 62 | 99 | 98 | 98 |
| 6 | 77 | 174 | 173 | 174 | 77 | 76 | 77 | 118 | 117 | 117 |
| 7 | 91 | 189 | 188 | 188 | 92 | 91 | 91 | 132 | 131 | 132 |
| 8 | 111 | 218 | 217 | 217 | 111 | 110 | 110 | 154 | 153 | 153 |
| 9 | 143 | 246 | 245 | 246 | 142 | 141 | 141 | 183 | 182 | 182 |
| 10 | 182 | 275 | 274 | 275 | 183 | 182 | 182 | 223 | 222 | 223 |
| 11 | 223 | 333 | 332 | 333 | 223 | 222 | 223 | 286 | 285 | 285 |
| 12 | 287 | 391 | 390 | 391 | 286 | 285 | 285 | 334 | 333 | 333 |
| 13 | 402 | 492 | 491 | 492 | 401 | 400 | 400 | 501 | 500 | 501 |
| 14 | 670 | 666 | 665 | 666 | 669 | 668 | 669 | 669 | 668 | 669 |
| 15 | 1005 | 999 | 998 | 998 | 1005 | 1004 | 1004 | 1005 | 1004 | 1004 |

For one example, for a given preamble sequence length $L_{RA}=2087$, the corresponding cyclic shift $N_{CS}$ can be selected from one of the examples in TABLE 3C.

TABLE 3C

Example cyclic shift mapping for $L_{RA} = 2087$.

| | Example # | | | | | | | | | |
|---|---|---|---|---|---|---|---|---|---|---|
| | 1 | 2 | 3 | 4 | 5 | 6 | 7 | 8 | 9 | 10 |
| zeroCorrelationZoneConfig | $N_{CS}$ | $N_{CS}$ | $N_{CS}$ | $N_{CS}$ | $N_{CS}$ | $N_{CS}$ | $N_{CS}$ | $N_{CS}$ | $N_{CS}$ | $N_{CS}$ |
| 0 | 0 | 0 | 0 | 0 | 0 | 0 | 0 | 0 | 0 | 0 |
| 1 | 32 | 31 | 30 | 30 | 33 | 32 | 32 | 33 | 32 | 32 |
| 2 | 38 | 61 | 60 | 60 | 38 | 37 | 37 | 65 | 64 | 65 |
| 3 | 46 | 91 | 90 | 90 | 45 | 44 | 45 | 83 | 82 | 82 |
| 4 | 54 | 121 | 120 | 120 | 55 | 54 | 55 | 95 | 94 | 95 |
| 5 | 65 | 151 | 150 | 150 | 65 | 64 | 65 | 102 | 101 | 102 |
| 6 | 80 | 181 | 180 | 180 | 80 | 79 | 80 | 122 | 121 | 122 |
| 7 | 94 | 196 | 195 | 195 | 95 | 94 | 95 | 137 | 136 | 137 |
| 8 | 115 | 226 | 225 | 225 | 115 | 114 | 114 | 160 | 159 | 159 |
| 9 | 149 | 256 | 255 | 255 | 147 | 146 | 147 | 190 | 189 | 189 |
| 10 | 189 | 286 | 285 | 285 | 190 | 189 | 189 | 232 | 231 | 231 |
| 11 | 231 | 346 | 345 | 345 | 232 | 231 | 231 | 297 | 296 | 296 |

TABLE 3C-continued

Example cyclic shift mapping for $L_{RA}$ = 2087.

| | Example # | | | | | | | | | |
|---|---|---|---|---|---|---|---|---|---|---|
| | 1 | 2 | 3 | 4 | 5 | 6 | 7 | 8 | 9 | 10 |
| 12 | 298 | 406 | 405 | 405 | 297 | 296 | 296 | 346 | 345 | 346 |
| 13 | 417 | 511 | 510 | 510 | 416 | 415 | 415 | 520 | 519 | 520 |
| 14 | 695 | 691 | 690 | 691 | 695 | 694 | 694 | 695 | 694 | 694 |
| 15 | 1043 | 1036 | 1035 | 1036 | 1043 | 1042 | 1043 | 1042 | 1042 | 1042 |

In one embodiment, for a new PRACH preamble sequence length, the mapping of a PRACH preamble sequence can be enhanced accordingly.

For one example, for a given preamble sequence length $L_{RA}=1583$, the corresponding $\bar{k}$ can be determined according to TABLE 4A, wherein $\Delta f^{RA}$ is the SCS of PRACH preamble, $\Delta f$ is the reference subcarrier spacing of a PUSCH, and $N_{RB}^{RA}$ is number of RB mapped for the PRACH preamble sequence.

TABLE 4A

Example determination method for $\bar{k}$.

| $L_{RA}$ | $\Delta f^{RA}$ | $\Delta f$ | $N_{RB}^{RA}$ | $\bar{k}$ |
|---|---|---|---|---|
| 1583 | 960 kHz | 960 kHz | 132 | 1 |

For another example, for a given preamble sequence length $L_{RA}=2011$, the corresponding $\bar{k}$ can be determined according to TABLE 4B, wherein $\Delta f^{RA}$ is the SCS of PRACH preamble, $\Delta f$ is the reference subcarrier spacing of a PUSCH, and $N_{RB}^{RA}$ is number of RB mapped for the PRACH preamble sequence.

TABLE 4B

Example determination method for $\bar{k}$.

| $L_{RA}$ | $\Delta f^{RA}$ | $\Delta f$ | $N_{RB}^{RA}$ | $\bar{k}$ |
|---|---|---|---|---|
| 2011 | 960 kHz | 960 kHz | 168 | 3 |

For yet another example, for a given preamble sequence length $L_{RA}=2087$, the corresponding $\bar{k}$ can be determined according to TABLE 4A.-3, wherein $\Delta f^{RA}$ is the SCS of PRACH preamble, $\Delta f$ is the reference subcarrier spacing of a PUSCH, and $N_{RB}^{RA}$ is number of RB mapped for the PRACH preamble sequence.

TABLE 4C

Example determination method for $\bar{k}$.

| $L^{RA}$ | $\Delta f^{RA}$ | $\Delta f$ | $N_{RB}^{RA}$ | $\bar{k}$ |
|---|---|---|---|---|
| 2087 | 960 kHz | 960 kHz | 174 | 1 |

In one embodiment, the PRACH preamble format for normal cyclic prefix (NCP) can be enhanced to support higher frequency range. For example, the CP duration and/or number of repeated sequences can be enhanced.

In one example, a new PRACH preamble format can be constructed from combination of at least one legacy Rel-15 PRACH preamble format.

For one example, a new PRACH preamble format can be constructed from combination of a Rel-15 PRACH preamble format Ax and a Rel-15 PRACH preamble format Bx, where x can be 1 or 2 or 3, wherein a CP length of the new PRACH format equals to the summation of CP lengths in PRACH preamble format Ax and PRACH preamble format Bx, and a GAP length of the new PRACH format equals to the GAP length of PRACH format Bx.

For another example, a new PRACH preamble format can be constructed from combination of at least one Rel-15 PRACH preamble format Ax, where x can be 1 or 2 or 3, wherein a CP length of the new PRACH preamble format equals to the summation of CP lengths in the PRACH preamble format Ax, and a GAP length is 0.

For yet another example, a new PRACH preamble format can be constructed from combination of at least one Rel-15 PRACH preamble format Bx, where x can be 1 or 2 or 3, wherein a CP length of the new PRACH preamble format equals to the summation of CP lengths in the PRACH preamble format Bx, and a GAP length of the new PRACH preamble format equals to the summation of the GAP lengths in the PRACH preamble format Bx.

Figure 7:
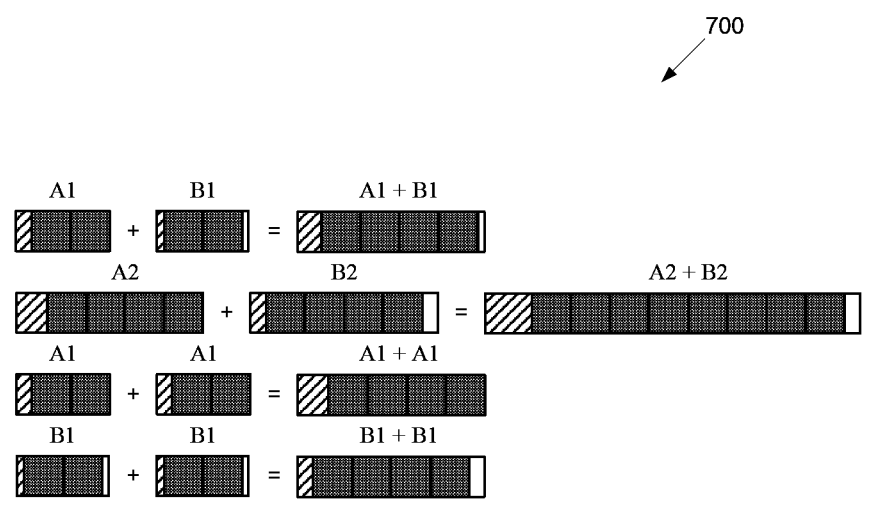

The example of using new PRACH preamble formats to construct from legacy Rel-15 PRACH preamble format is shown in FIG. 7, and example new PRACH preamble formats are shown in TABLE 5, wherein the PRACH preamble sequence length $L_{RA}$ is as scribed in embodiments of this disclosure, $\Delta f^{RA}$ is the SCS of PRACH preamble, $N_{CP}^{RA}$ is the length of CP in the PRACH preamble format, $N_u$ is the length of sequence(s) in the PRACH preamble format, $N_{GAP}^{RA}$ is the length of GAP in the PRACH preamble format, $N_{symb}^{RA}$ is the total number of symbols for the PRACH preamble format, and K is constant equal to 64.

FIG. 7 illustrates example new PRACH preamble formats 700 constructed from legacy Rel-15 PRACH format according to embodiments of the present disclosure. An embodiment of the new PRACH preamble formats 700 shown in FIG. 7 is for illustration only.

TABLE 5

Example new PRACH preamble formats constructed from legacy PRACH preamble formats.

| Format | $L_{RA}$ | $\Delta f^{RA}$ (kHz) | $N_{CP}^{RA}$ | $N_u$ | $N_{GAP}^{RA}$ | $N_{symb}^{RA}$ |
|---|---|---|---|---|---|---|
| A1 + B1 | $L_{RA}$ | $15 \cdot 2^\mu$ | $504\kappa \cdot 2^{-\mu}$ | $4 \cdot 2048\kappa \cdot 2^{-\mu}$ | $72\kappa \cdot 2^{-\mu}$ | 4 |
| A2 + B2 | $L_{RA}$ | $15 \cdot 2^\mu$ | $936\kappa \cdot 2^{-\mu}$ | $8 \cdot 2048\kappa \cdot 2^{-\mu}$ | $216\kappa \cdot 2^{-\mu}$ | 8 |

TABLE 5-continued

Example new PRACH preamble formats constructed from legacy PRACH preamble formats.

| Format | $L_{RA}$ | $\Delta f^{RA}$ (kHz) | $N_{CP}^{RA}$ | $N_u$ | $N_{GAP}^{RA}$ | $N_{symb}^{RA}$ |
|---|---|---|---|---|---|---|
| A3 + B3 | $L_{RA}$ | $15 \cdot 2^\mu$ | $1368\kappa \cdot 2^{-\mu}$ | $12 \cdot 2048\kappa \cdot 2^{-\mu}$ | $360\kappa \cdot 2^{-\mu}$ | 12 |
| A1 + A1 | $L_{RA}$ | $15 \cdot 2^\mu$ | $576\kappa \cdot 2^{-\mu}$ | $4 \cdot 2048\kappa \cdot 2^{-\mu}$ | 0 | 4 |
| A2 + A2 | $L_{RA}$ | $15 \cdot 2^\mu$ | $1152\kappa \cdot 2^{-\mu}$ | $8 \cdot 2048\kappa \cdot 2^{-\mu}$ | 0 | 8 |
| A3 + A3 | $L_{RA}$ | $15 \cdot 2^\mu$ | $1728\kappa \cdot 2^{-\mu}$ | $12 \cdot 2048\kappa \cdot 2^{-\mu}$ | 0 | 12 |
| B1 + B1 | $L_{RA}$ | $15 \cdot 2^\mu$ | $432\kappa \cdot 2^{-\mu}$ | $4 \cdot 2048\kappa \cdot 2^{-\mu}$ | $144\kappa \cdot 2^{-\mu}$ | 4 |
| B2 + B2 | $L_{RA}$ | $15 \cdot 2^\mu$ | $720\kappa \cdot 2^{-\mu}$ | $8 \cdot 2048\kappa \cdot 2^{-\mu}$ | $432\kappa \cdot 2^{-\mu}$ | 8 |
| B3 + B3 | $L_{RA}$ | $15 \cdot 2^\mu$ | $1008\kappa \cdot 2^{-\mu}$ | $12 \cdot 2048\kappa \cdot 2^{-\mu}$ | $720\kappa \cdot 2^{-\mu}$ | 12 |

In another example, a new PRACH preamble format can be constructed from extension of at least one legacy Rel-15 PRACH preamble format.

The example of using new PRACH preamble formats to construct from legacy Rel-15 PRACH preamble format is shown in TABLE 6, and example new PRACH preamble formats are shown in TABLE 6, wherein the PRACH preamble sequence length $L_{RA}$ is as scribed in embodiments of this disclosure, $\Delta f^{RA}$ is the SCS of PRACH preamble, $N_{CP}^{RA}$ is the length of CP in the PRACH preamble format, $N_u$ is the length of sequence(s) in the PRACH preamble format, $N_{GAP}^{RA}$ is the length of GAP in the PRACH preamble format, $N_{symb}^{RA}$ is the total number of symbols for the PRACH preamble format, and K is constant equal to 64.

Figure 8:
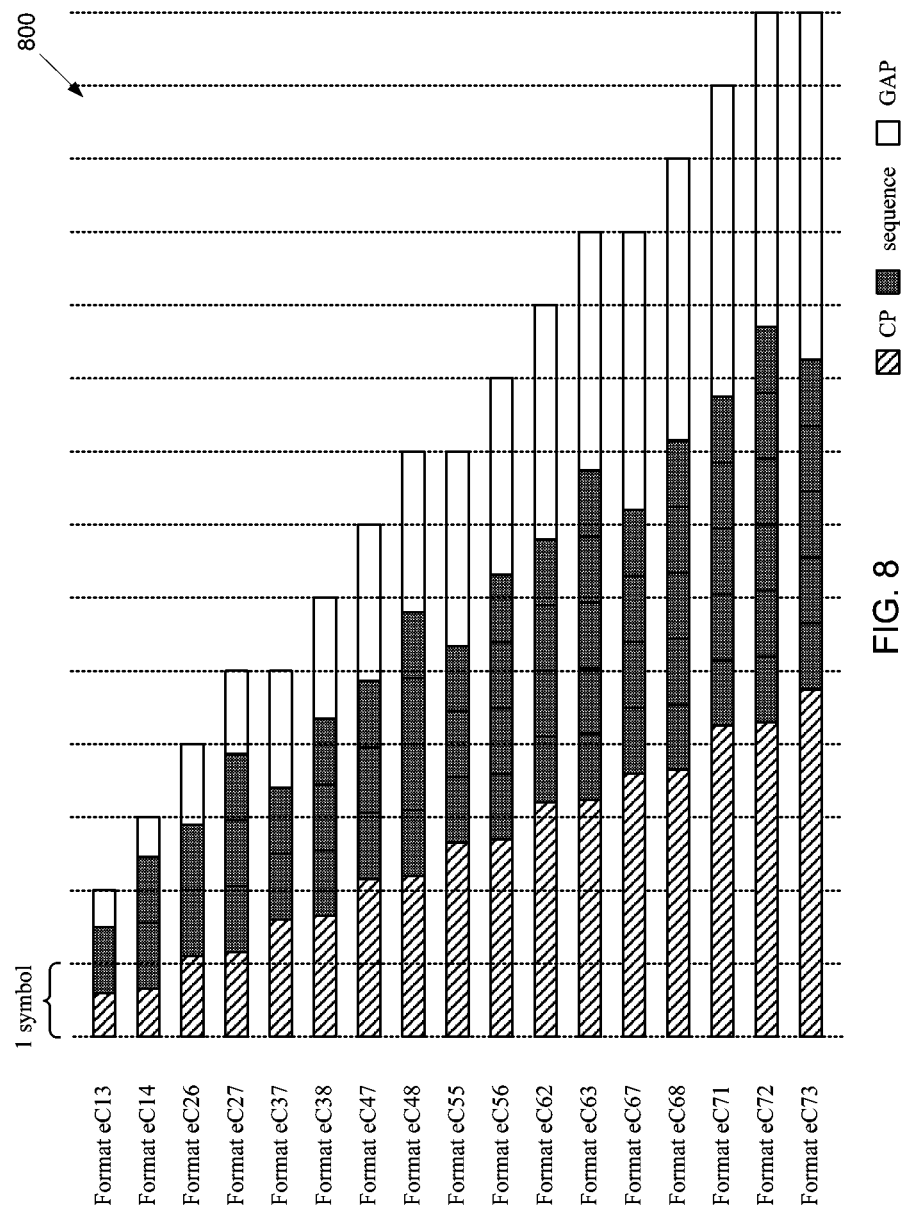
FIG. 8 illustrates example new PRACH preamble formats extended from legacy Rel-15 PRACH format according to embodiments of the present disclosure.

FIG. 8 illustrates example new PRACH preamble formats 800 extended from legacy Rel-15 PRACH format according to embodiments of the present disclosure. An embodiment of the new PRACH preamble formats 800 shown in FIG. 8 is for illustration only.

FIG. 8 illustrates new PRACH preamble formats extended from legacy Rel-15 PRACH format.

TABLE 6

Example PRACH preamble formats extended from legacy preamble format.

| Format | $L_{RA}$ | $\Delta f^{RA}$ (kHz) | $N_{CP}^{RA}$ | $N_u$ | $N_{GAP}^{RA}$ | $N_{symb}^{RA}$ |
|---|---|---|---|---|---|---|
| eC0 | $L_{RA}$ | $15 \cdot 2^\mu$ | $216\,\kappa \cdot 2^{-\mu}$ | $2 \cdot 2048\,\kappa \cdot 2^{-\mu}$ | $72\,\kappa \cdot 2^{-\mu}$ | 2 |
| eC1 | $L_{RA}$ | $15 \cdot 2^\mu$ | $288\,\kappa \cdot 2^{-\mu}$ | $3 \cdot 2048\,\kappa \cdot 2^{-\mu}$ | $144\,\kappa \cdot 2^{-\mu}$ | 3 |
| eC2 | $L_{RA}$ | $15 \cdot 2^\mu$ | $360\,\kappa \cdot 2^{-\mu}$ | $4 \cdot 2048\,\kappa \cdot 2^{-\mu}$ | $216\,\kappa \cdot 2^{-\mu}$ | 4 |
| eC3 | $L_{RA}$ | $15 \cdot 2^\mu$ | $432\,\kappa \cdot 2^{-\mu}$ | $5 \cdot 2048\,\kappa \cdot 2^{-\mu}$ | $288\,\kappa \cdot 2^{-\mu}$ | 5 |
| eC4 | $L_{RA}$ | $15 \cdot 2^\mu$ | $504\,\kappa \cdot 2^{-\mu}$ | $6 \cdot 2048\,\kappa \cdot 2^{-\mu}$ | $360\,\kappa \cdot 2^{-\mu}$ | 6 |
| eC5 | $L_{RA}$ | $15 \cdot 2^\mu$ | $576\,\kappa \cdot 2^{-\mu}$ | $7 \cdot 2048\,\kappa \cdot 2^{-\mu}$ | $432\,\kappa \cdot 2^{-\mu}$ | 7 |
| eC6 | $L_{RA}$ | $15 \cdot 2^\mu$ | $648\,\kappa \cdot 2^{-\mu}$ | $8 \cdot 2048\,\kappa \cdot 2^{-\mu}$ | $504\,\kappa \cdot 2^{-\mu}$ | 8 |
| eC7 | $L_{RA}$ | $15 \cdot 2^\mu$ | $720\,\kappa \cdot 2^{-\mu}$ | $9 \cdot 2048\,\kappa \cdot 2^{-\mu}$ | $576\,\kappa \cdot 2^{-\mu}$ | 9 |
| eC8 | $L_{RA}$ | $15 \cdot 2^\mu$ | $792\,\kappa \cdot 2^{-\mu}$ | $10 \cdot 2048\,\kappa \cdot 2^{-\mu}$ | $648\,\kappa \cdot 2^{-\mu}$ | 10 |
| eC9 | $L_{RA}$ | $15 \cdot 2^\mu$ | $864\,\kappa \cdot 2^{-\mu}$ | $11 \cdot 2048\,\kappa \cdot 2^{-\mu}$ | $720\,\kappa \cdot 2^{-\mu}$ | 11 |
| eC10 | $L_{RA}$ | $15 \cdot 2^\mu$ | $936\,\kappa \cdot 2^{-\mu}$ | $12 \cdot 2048\,\kappa \cdot 2^{-\mu}$ | $792\,\kappa \cdot 2^{-\mu}$ | 12 |
| eC11 | $L_{RA}$ | $15 \cdot 2^\mu$ | $1008\,\kappa \cdot 2^{-\mu}$ | $13 \cdot 2048\,\kappa \cdot 2^{-\mu}$ | $864\,\kappa \cdot 2^{-\mu}$ | 13 |
| eC12 | $L_{RA}$ | $15 \cdot 2^\mu$ | $1080\,\kappa \cdot 2^{-\mu}$ | $14 \cdot 2048\,\kappa \cdot 2^{-\mu}$ | $936\,\kappa \cdot 2^{-\mu}$ | 14 |
| eC13 | $L_{RA}$ | $15 \cdot 2^\mu$ | $1240\,\kappa \cdot 2^{-\mu}$ | $1 \cdot 2048\,\kappa \cdot 2^{-\mu}$ | $1096\,\kappa \cdot 2^{-\mu}$ | 2 |
| eC14 | $L_{RA}$ | $15 \cdot 2^\mu$ | $1312\,\kappa \cdot 2^{-\mu}$ | $2 \cdot 2048\,\kappa \cdot 2^{-\mu}$ | $1168\,\kappa \cdot 2^{-\mu}$ | 3 |
| eC15 | $L_{RA}$ | $15 \cdot 2^\mu$ | $1384\,\kappa \cdot 2^{-\mu}$ | $3 \cdot 2048\,\kappa \cdot 2^{-\mu}$ | $1240\,\kappa \cdot 2^{-\mu}$ | 4 |
| eC16 | $L_{RA}$ | $15 \cdot 2^\mu$ | $1456\,\kappa \cdot 2^{-\mu}$ | $4 \cdot 2048\,\kappa \cdot 2^{-\mu}$ | $1312\,\kappa \cdot 2^{-\mu}$ | 5 |
| eC17 | $L_{RA}$ | $15 \cdot 2^\mu$ | $1528\,\kappa \cdot 2^{-\mu}$ | $5 \cdot 2048\,\kappa \cdot 2^{-\mu}$ | $1384\,\kappa \cdot 2^{-\mu}$ | 6 |
| eC18 | $L_{RA}$ | $15 \cdot 2^\mu$ | $1600\,\kappa \cdot 2^{-\mu}$ | $6 \cdot 2048\,\kappa \cdot 2^{-\mu}$ | $1456\,\kappa \cdot 2^{-\mu}$ | 7 |
| eC19 | $L_{RA}$ | $15 \cdot 2^\mu$ | $1672\,\kappa \cdot 2^{-\mu}$ | $7 \cdot 2048\,\kappa \cdot 2^{-\mu}$ | $1528\,\kappa \cdot 2^{-\mu}$ | 8 |
| eC20 | $L_{RA}$ | $15 \cdot 2^\mu$ | $1744\,\kappa \cdot 2^{-\mu}$ | $8 \cdot 2048\,\kappa \cdot 2^{-\mu}$ | $1600\,\kappa \cdot 2^{-\mu}$ | 9 |
| eC21 | $L_{RA}$ | $15 \cdot 2^\mu$ | $1816\,\kappa \cdot 2^{-\mu}$ | $9 \cdot 2048\,\kappa \cdot 2^{-\mu}$ | $1672\,\kappa \cdot 2^{-\mu}$ | 10 |
| eC22 | $L_{RA}$ | $15 \cdot 2^\mu$ | $1888\,\kappa \cdot 2^{-\mu}$ | $10 \cdot 2048\,\kappa \cdot 2^{-\mu}$ | $1744\,\kappa \cdot 2^{-\mu}$ | 11 |
| eC23 | $L_{RA}$ | $15 \cdot 2^\mu$ | $1960\,\kappa \cdot 2^{-\mu}$ | $11 \cdot 2048\,\kappa \cdot 2^{-\mu}$ | $1816\,\kappa \cdot 2^{-\mu}$ | 12 |
| eC24 | $L_{RA}$ | $15 \cdot 2^\mu$ | $2032\,\kappa \cdot 2^{-\mu}$ | $12 \cdot 2048\,\kappa \cdot 2^{-\mu}$ | $1888\,\kappa \cdot 2^{-\mu}$ | 13 |
| eC25 | $L_{RA}$ | $15 \cdot 2^\mu$ | $2104\,\kappa \cdot 2^{-\mu}$ | $13 \cdot 2048\,\kappa \cdot 2^{-\mu}$ | $1960\,\kappa \cdot 2^{-\mu}$ | 14 |
| eC26 | $L_{RA}$ | $15 \cdot 2^\mu$ | $2408\,\kappa \cdot 2^{-\mu}$ | $2 \cdot 2048\,\kappa \cdot 2^{-\mu}$ | $2264\,\kappa \cdot 2^{-\mu}$ | 4 |
| eC27 | $L_{RA}$ | $15 \cdot 2^\mu$ | $2480\,\kappa \cdot 2^{-\mu}$ | $3 \cdot 2048\,\kappa \cdot 2^{-\mu}$ | $2336\,\kappa \cdot 2^{-\mu}$ | 5 |
| eC28 | $L_{RA}$ | $15 \cdot 2^\mu$ | $2552\,\kappa \cdot 2^{-\mu}$ | $4 \cdot 2048\,\kappa \cdot 2^{-\mu}$ | $2408\,\kappa \cdot 2^{-\mu}$ | 6 |
| eC29 | $L_{RA}$ | $15 \cdot 2^\mu$ | $2624\,\kappa \cdot 2^{-\mu}$ | $5 \cdot 2048\,\kappa \cdot 2^{-\mu}$ | $2480\,\kappa \cdot 2^{-\mu}$ | 7 |
| eC30 | $L_{RA}$ | $15 \cdot 2^\mu$ | $2696\,\kappa \cdot 2^{-\mu}$ | $6 \cdot 2048\,\kappa \cdot 2^{-\mu}$ | $2552\,\kappa \cdot 2^{-\mu}$ | 8 |
| eC31 | $L_{RA}$ | $15 \cdot 2^\mu$ | $2768\,\kappa \cdot 2^{-\mu}$ | $7 \cdot 2048\,\kappa \cdot 2^{-\mu}$ | $2624\,\kappa \cdot 2^{-\mu}$ | 9 |
| eC32 | $L_{RA}$ | $15 \cdot 2^\mu$ | $2840\,\kappa \cdot 2^{-\mu}$ | $8 \cdot 2048\,\kappa \cdot 2^{-\mu}$ | $2696\,\kappa \cdot 2^{-\mu}$ | 10 |
| eC33 | $L_{RA}$ | $15 \cdot 2^\mu$ | $2912\,\kappa \cdot 2^{-\mu}$ | $9 \cdot 2048\,\kappa \cdot 2^{-\mu}$ | $2768\,\kappa \cdot 2^{-\mu}$ | 11 |
| eC34 | $L_{RA}$ | $15 \cdot 2^\mu$ | $2984\,\kappa \cdot 2^{-\mu}$ | $10 \cdot 2048\,\kappa \cdot 2^{-\mu}$ | $2840\,\kappa \cdot 2^{-\mu}$ | 12 |
| eC35 | $L_{RA}$ | $15 \cdot 2^\mu$ | $3056\,\kappa \cdot 2^{-\mu}$ | $11 \cdot 2048\,\kappa \cdot 2^{-\mu}$ | $2912\,\kappa \cdot 2^{-\mu}$ | 13 |
| eC36 | $L_{RA}$ | $15 \cdot 2^\mu$ | $3128\,\kappa \cdot 2^{-\mu}$ | $12 \cdot 2048\,\kappa \cdot 2^{-\mu}$ | $2984\,\kappa \cdot 2^{-\mu}$ | 14 |
| eC37 | $L_{RA}$ | $15 \cdot 2^\mu$ | $3504\,\kappa \cdot 2^{-\mu}$ | $2 \cdot 2048\,\kappa \cdot 2^{-\mu}$ | $3360\,\kappa \cdot 2^{-\mu}$ | 5 |
| eC38 | $L_{RA}$ | $15 \cdot 2^\mu$ | $3576\,\kappa \cdot 2^{-\mu}$ | $3 \cdot 2048\,\kappa \cdot 2^{-\mu}$ | $3432\,\kappa \cdot 2^{-\mu}$ | 6 |
| eC39 | $L_{RA}$ | $15 \cdot 2^\mu$ | $3648\,\kappa \cdot 2^{-\mu}$ | $4 \cdot 2048\,\kappa \cdot 2^{-\mu}$ | $3504\,\kappa \cdot 2^{-\mu}$ | 7 |
| eC40 | $L_{RA}$ | $15 \cdot 2^\mu$ | $3720\,\kappa \cdot 2^{-\mu}$ | $5 \cdot 2048\,\kappa \cdot 2^{-\mu}$ | $3576\,\kappa \cdot 2^{-\mu}$ | 8 |
| eC41 | $L_{RA}$ | $15 \cdot 2^\mu$ | $3792\,\kappa \cdot 2^{-\mu}$ | $6 \cdot 2048\,\kappa \cdot 2^{-\mu}$ | $3648\,\kappa \cdot 2^{-\mu}$ | 9 |
| eC42 | $L_{RA}$ | $15 \cdot 2^\mu$ | $3864\,\kappa \cdot 2^{-\mu}$ | $7 \cdot 2048\,\kappa \cdot 2^{-\mu}$ | $3720\,\kappa \cdot 2^{-\mu}$ | 10 |
| eC43 | $L_{RA}$ | $15 \cdot 2^\mu$ | $3936\,\kappa \cdot 2^{-\mu}$ | $8 \cdot 2048\,\kappa \cdot 2^{-\mu}$ | $3792\,\kappa \cdot 2^{-\mu}$ | 11 |
| eC44 | $L_{RA}$ | $15 \cdot 2^\mu$ | $4008\,\kappa \cdot 2^{-\mu}$ | $9 \cdot 2048\,\kappa \cdot 2^{-\mu}$ | $3864\,\kappa \cdot 2^{-\mu}$ | 12 |

TABLE 6-continued

Example PRACH preamble formats extended from legacy preamble format.

| Format | $L_{RA}$ | $\Delta f^{RA}$ (kHz) | $N_{CP}^{RA}$ | $N_u$ | $N_{GAP}^{RA}$ | $N_{symb}^{RA}$ |
|---|---|---|---|---|---|---|
| eC45 | $L_{RA}$ | $15 \cdot 2^\mu$ | $4080\kappa \cdot 2^{-\mu}$ | $10 \cdot 2048\kappa \cdot 2^{-\mu}$ | $3936\kappa \cdot 2^{-\mu}$ | 13 |
| eC46 | $L_{RA}$ | $15 \cdot 2^\mu$ | $4152\kappa \cdot 2^{-\mu}$ | $11 \cdot 2048\kappa \cdot 2^{-\mu}$ | $4008\kappa \cdot 2^{-\mu}$ | 14 |
| eC47 | $L_{RA}$ | $15 \cdot 2^\mu$ | $4672\kappa \cdot 2^{-\mu}$ | $3 \cdot 2048\kappa \cdot 2^{-\mu}$ | $4528\kappa \cdot 2^{-\mu}$ | 7 |
| eC48 | $L_{RA}$ | $15 \cdot 2^\mu$ | $4744\kappa \cdot 2^{-\mu}$ | $4 \cdot 2048\kappa \cdot 2^{-\mu}$ | $4600\kappa \cdot 2^{-\mu}$ | 8 |
| eC49 | $L_{RA}$ | $15 \cdot 2^\mu$ | $4816\kappa \cdot 2^{-\mu}$ | $5 \cdot 2048\kappa \cdot 2^{-\mu}$ | $4672\kappa \cdot 2^{-\mu}$ | 9 |
| eC50 | $L_{RA}$ | $15 \cdot 2^\mu$ | $4888\kappa \cdot 2^{-\mu}$ | $6 \cdot 2048\kappa \cdot 2^{-\mu}$ | $4744\kappa \cdot 2^{-\mu}$ | 10 |
| eC51 | $L_{RA}$ | $15 \cdot 2^\mu$ | $4960\kappa \cdot 2^{-\mu}$ | $7 \cdot 2048\kappa \cdot 2^{-\mu}$ | $4816\kappa \cdot 2^{-\mu}$ | 11 |
| eC52 | $L_{RA}$ | $15 \cdot 2^\mu$ | $5032\kappa \cdot 2^{-\mu}$ | $8 \cdot 2048\kappa \cdot 2^{-\mu}$ | $4888\kappa \cdot 2^{-\mu}$ | 12 |
| eC53 | $L_{RA}$ | $15 \cdot 2^\mu$ | $5104\kappa \cdot 2^{-\mu}$ | $9 \cdot 2048\kappa \cdot 2^{-\mu}$ | $4960\kappa \cdot 2^{-\mu}$ | 13 |
| eC54 | $L_{RA}$ | $15 \cdot 2^\mu$ | $5176\kappa \cdot 2^{-\mu}$ | $10 \cdot 2048\kappa \cdot 2^{-\mu}$ | $5032\kappa \cdot 2^{-\mu}$ | 14 |
| eC55 | $L_{RA}$ | $15 \cdot 2^\mu$ | $5768\kappa \cdot 2^{-\mu}$ | $3 \cdot 2048\kappa \cdot 2^{-\mu}$ | $5624\kappa \cdot 2^{-\mu}$ | 8 |
| eC56 | $L_{RA}$ | $15 \cdot 2^\mu$ | $5840\kappa \cdot 2^{-\mu}$ | $4 \cdot 2048\kappa \cdot 2^{-\mu}$ | $5696\kappa \cdot 2^{-\mu}$ | 9 |
| eC57 | $L_{RA}$ | $15 \cdot 2^\mu$ | $5912\kappa \cdot 2^{-\mu}$ | $5 \cdot 2048\kappa \cdot 2^{-\mu}$ | $5768\kappa \cdot 2^{-\mu}$ | 10 |
| eC58 | $L_{RA}$ | $15 \cdot 2^\mu$ | $5984\kappa \cdot 2^{-\mu}$ | $6 \cdot 2048\kappa \cdot 2^{-\mu}$ | $5840\kappa \cdot 2^{-\mu}$ | 11 |
| eC59 | $L_{RA}$ | $15 \cdot 2^\mu$ | $6056\kappa \cdot 2^{-\mu}$ | $7 \cdot 2048\kappa \cdot 2^{-\mu}$ | $5912\kappa \cdot 2^{-\mu}$ | 12 |
| eC60 | $L_{RA}$ | $15 \cdot 2^\mu$ | $6128\kappa \cdot 2^{-\mu}$ | $8 \cdot 2048\kappa \cdot 2^{-\mu}$ | $5984\kappa \cdot 2^{-\mu}$ | 13 |
| eC61 | $L_{RA}$ | $15 \cdot 2^\mu$ | $6200\kappa \cdot 2^{-\mu}$ | $9 \cdot 2048\kappa \cdot 2^{-\mu}$ | $6056\kappa \cdot 2^{-\mu}$ | 14 |
| eC62 | $L_{RA}$ | $15 \cdot 2^\mu$ | $6936\kappa \cdot 2^{-\mu}$ | $4 \cdot 2048\kappa \cdot 2^{-\mu}$ | $6792\kappa \cdot 2^{-\mu}$ | 10 |
| eC63 | $L_{RA}$ | $15 \cdot 2^\mu$ | $7008\kappa \cdot 2^{-\mu}$ | $5 \cdot 2048\kappa \cdot 2^{-\mu}$ | $6864\kappa \cdot 2^{-\mu}$ | 11 |
| eC64 | $L_{RA}$ | $15 \cdot 2^\mu$ | $7080\kappa \cdot 2^{-\mu}$ | $6 \cdot 2048\kappa \cdot 2^{-\mu}$ | $6936\kappa \cdot 2^{-\mu}$ | 12 |
| eC65 | $L_{RA}$ | $15 \cdot 2^\mu$ | $7152\kappa \cdot 2^{-\mu}$ | $7 \cdot 2048\kappa \cdot 2^{-\mu}$ | $7008\kappa \cdot 2^{-\mu}$ | 13 |
| eC66 | $L_{RA}$ | $15 \cdot 2^\mu$ | $7224\kappa \cdot 2^{-\mu}$ | $8 \cdot 2048\kappa \cdot 2^{-\mu}$ | $7080\kappa \cdot 2^{-\mu}$ | 14 |
| eC67 | $L_{RA}$ | $15 \cdot 2^\mu$ | $8032\kappa \cdot 2^{-\mu}$ | $4 \cdot 2048\kappa \cdot 2^{-\mu}$ | $7888\kappa \cdot 2^{-\mu}$ | 11 |
| eC68 | $L_{RA}$ | $15 \cdot 2^\mu$ | $8104\kappa \cdot 2^{-\mu}$ | $5 \cdot 2048\kappa \cdot 2^{-\mu}$ | $7960\kappa \cdot 2^{-\mu}$ | 12 |
| eC69 | $L_{RA}$ | $15 \cdot 2^\mu$ | $8176\kappa \cdot 2^{-\mu}$ | $6 \cdot 2048\kappa \cdot 2^{-\mu}$ | $8032\kappa \cdot 2^{-\mu}$ | 13 |
| eC70 | $L_{RA}$ | $15 \cdot 2^\mu$ | $8248\kappa \cdot 2^{-\mu}$ | $7 \cdot 2048\kappa \cdot 2^{-\mu}$ | $8104\kappa \cdot 2^{-\mu}$ | 14 |
| eC71 | $L_{RA}$ | $15 \cdot 2^\mu$ | $9200\kappa \cdot 2^{-\mu}$ | $5 \cdot 2048\kappa \cdot 2^{-\mu}$ | $9056\kappa \cdot 2^{-\mu}$ | 13 |
| eC72 | $L_{RA}$ | $15 \cdot 2^\mu$ | $9272\kappa \cdot 2^{-\mu}$ | $6 \cdot 2048\kappa \cdot 2^{-\mu}$ | $9128\kappa \cdot 2^{-\mu}$ | 14 |
| eC73 | $L_{RA}$ | $15 \cdot 2^\mu$ | $10296\kappa \cdot 2^{-\mu}$ | $5 \cdot 2048\kappa \cdot 2^{-\mu}$ | $10152\kappa \cdot 2^{-\mu}$ | 14 |

The present disclosure also focuses on the enhancement to the PRACH preamble design for extended cyclic prefix, to be applicable to wideband carrier. More precisely, the following components are included in this disclosure: a first type of PRACH preamble format, wherein the duration of CP and sequences of the PRACH preamble equals an integer multiple of symbol length with extended CP; and a second type of PRACH preamble format, wherein the duration of CP and sequences of the PRACH preamble is smaller than an integer multiple of symbol length with extended CP.

In one embodiment, a first PRACH preamble format can include a duration $N_{CP}^{RA}$ for CP of PRACH preamble, and a following duration $N_u$ for a number $N_{SEQ}^{RA}$ of sequences, wherein the total duration of the CP and sequences is an integer multiple of symbol durations with extended CP (wherein the integer is denoted as $N_{symb}^{RA}$), and each sequence in the number of sequences has same duration of $2048\kappa \cdot 2^{-\mu}$.

For one example of the first PRACH preamble format, $N_{SEQ}^{RA}=N_{symb}^{RA}$. Illustration of example PRACH preamble formats are shown in and example new PRACH preamble formats are shown in FIG. 9, and more examples are shown in TABLE 7, wherein the PRACH preamble sequence length is given by $L_{RA}$, $\Delta f^{RA}$ is the SCS of PRACH preamble, $N_{CP}^{RA}$ is the length of CP in the PRACH preamble format, $N_u$ is the length of sequence(s) in the PRACH preamble format which includes $N_{SEQ}^{RA}$ number of repeated sequences (i.e., $N_{SEQ}^{RA}$ is the integer before $2048\kappa \cdot 2^{-\mu}$), $N_{GAP}^{RA}$ is the length of GAP in the PRACH preamble format, $N_{symb}^{RA}$ is the total number of symbols for the PRACH preamble format, and K is constant equal to 64.

Figure 9:
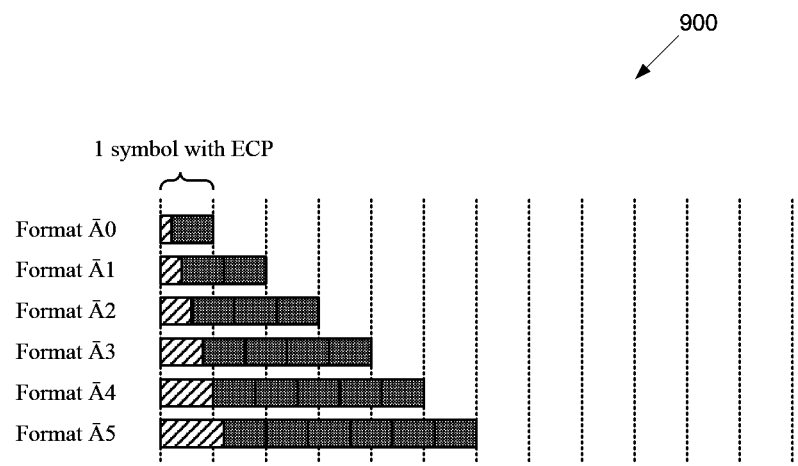
FIG. 9 illustrates example PRACH preamble formats for extended CP length according to embodiments of the present disclosure.

FIG. 9 illustrates example PRACH preamble formats 900 for extended CP length according to embodiments of the present disclosure. An embodiment of the PRACH preamble formats 900 shown in FIG. 9 is for illustration only.

TABLE 7

Example first PRACH preamble format for extended CP length

| Format | $L_{RA}$ | $\Delta f^{RA}$ (kHz) | $N_{CP}^{RA}$ | $N_u(N_{SEQ}^{RA} \cdot 2048\kappa \cdot 2^{-\mu})$ | $N_{GAP}^{RA}$ | $N_{symb}^{RA}$ |
|---|---|---|---|---|---|---|
| $\overline{A}0$ | $L_{RA}$ | $15 \cdot 2^\mu$ | $512\kappa \cdot 2^{-\mu}$ | $1 \cdot 2048\kappa \cdot 2^{-\mu}$ | 0 | 1 |
| $\overline{A}1$ | $L_{RA}$ | $15 \cdot 2^\mu$ | $1024\kappa \cdot 2^{-\mu}$ | $2 \cdot 2048\kappa \cdot 2^{-\mu}$ | 0 | 2 |
| $\overline{A}2$ | $L_{RA}$ | $15 \cdot 2^\mu$ | $1536\kappa \cdot 2^{-\mu}$ | $3 \cdot 2048\kappa \cdot 2^{-\mu}$ | 0 | 3 |
| $\overline{A}3$ | $L_{RA}$ | $15 \cdot 2^\mu$ | $2048\kappa \cdot 2^{-\mu}$ | $4 \cdot 2048\kappa \cdot 2^{-\mu}$ | 0 | 4 |
| $\overline{A}4$ | $L_{RA}$ | $15 \cdot 2^\mu$ | $2560\kappa \cdot 2^{-\mu}$ | $5 \cdot 2048\kappa \cdot 2^{-\mu}$ | 0 | 5 |
| $\overline{A}5$ | $L_{RA}$ | $15 \cdot 2^\mu$ | $3072\kappa \cdot 2^{-\mu}$ | $6 \cdot 2048\kappa \cdot 2^{-\mu}$ | 0 | 6 |
| $\overline{A}6$ | $L_{RA}$ | $15 \cdot 2^\mu$ | $3584\kappa \cdot 2^{-\mu}$ | $7 \cdot 2048\kappa \cdot 2^{-\mu}$ | 0 | 7 |
| $\overline{A}7$ | $L_{RA}$ | $15 \cdot 2^\mu$ | $4096\kappa \cdot 2^{-\mu}$ | $8 \cdot 2048\kappa \cdot 2^{-\mu}$ | 0 | 8 |
| $\overline{A}8$ | $L_{RA}$ | $15 \cdot 2^\mu$ | $4608\kappa \cdot 2^{-\mu}$ | $9 \cdot 2048\kappa \cdot 2^{-\mu}$ | 0 | 9 |
| $\overline{A}9$ | $L_{RA}$ | $15 \cdot 2^\mu$ | $5120\kappa \cdot 2^{-\mu}$ | $10 \cdot 2048\kappa \cdot 2^{-\mu}$ | 0 | 10 |
| $\overline{A}10$ | $L_{RA}$ | $15 \cdot 2^\mu$ | $5632\kappa \cdot 2^{-\mu}$ | $11 \cdot 2048\kappa \cdot 2^{-\mu}$ | 0 | 11 |
| $\overline{A}11$ | $L_{RA}$ | $15 \cdot 2^\mu$ | $6144\kappa \cdot 2^{-\mu}$ | $12 \cdot 2048\kappa \cdot 2^{-\mu}$ | 0 | 12 |

For another example of the first PRACH preamble format, $N_{SEQ}^{RA} > N_{symb}^{RA}$. Illustration of example PRACH preamble formats are shown in and example new PRACH preamble formats are shown in FIG. 10, and more examples are shown in TABLE 8, wherein the PRACH preamble sequence length is given by $L_{RA}$, $\Delta f^{RA}$ is the SCS of PRACH preamble, $N_{CP}^{RA}$ is the length of CP in the PRACH preamble format, $N_u$ is the length of sequence(s) in the PRACH preamble format which includes $N_{SEQ}^{RA}$ number of repeated sequences (i.e., $N_{SEQ}^{RA}$ is the integer before $2048\kappa \cdot 2^{-\mu}$), $N_{GAP}^{RA}$ is the length of GAP in the PRACH preamble format, $N_{symb}^{RA}$ is the total number of symbols for the PRACH preamble format, and K is constant equal to 64.

Figure 10:
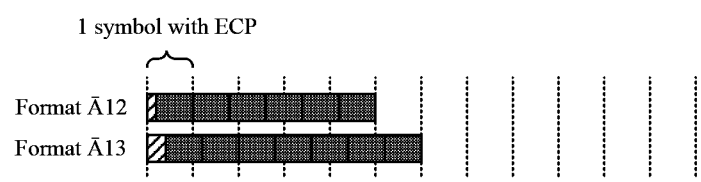
FIG. 10 illustrates another example PRACH preamble format for extended CP length according to embodiments of the present disclosure.

FIG. 10 illustrates another example PRACH preamble format 1000 for extended CP length according to embodiments of the present disclosure. An embodiment of the PRACH preamble format 1000 shown in FIG. 10 is for illustration only.

TABLE 8

Example first PRACH preamble format for extended CP length.

| Format | $L_{RA}$ | $\Delta f^{RA}$ (kHz) | $N_{CP}^{RA}$ | $N_u(N_{SEQ}^{RA} \cdot 2048\kappa \cdot 2^{-\mu})$ | $N_{GAP}^{RA}$ | $N_{symb}^{RA}$ |
|---|---|---|---|---|---|---|
| $\overline{A}12$ | $L_{RA}$ | $15 \cdot 2^\mu$ | $512\kappa \cdot 2^{-\mu}$ | $6 \cdot 2048\kappa \cdot 2^{-\mu}$ | 0 | 5 |
| $\overline{A}13$ | $L_{RA}$ | $15 \cdot 2^\mu$ | $1024\kappa \cdot 2^{-\mu}$ | $7 \cdot 2048\kappa \cdot 2^{-\mu}$ | 0 | 6 |
| $\overline{A}14$ | $L_{RA}$ | $15 \cdot 2^\mu$ | $1536\kappa \cdot 2^{-\mu}$ | $8 \cdot 2048\kappa \cdot 2^{-\mu}$ | 0 | 7 |
| $\overline{A}15$ | $L_{RA}$ | $15 \cdot 2^\mu$ | $2048\kappa \cdot 2^{-\mu}$ | $9 \cdot 2048\kappa \cdot 2^{-\mu}$ | 0 | 8 |
| $\overline{A}16$ | $L_{RA}$ | $15 \cdot 2^\mu$ | $2560\kappa \cdot 2^{-\mu}$ | $10 \cdot 2048\kappa \cdot 2^{-\mu}$ | 0 | 9 |
| $\overline{A}17$ | $L_{RA}$ | $15 \cdot 2^\mu$ | $3072\kappa \cdot 2^{-\mu}$ | $11 \cdot 2048\kappa \cdot 2^{-\mu}$ | 0 | 10 |
| $\overline{A}18$ | $L_{RA}$ | $15 \cdot 2^\mu$ | $3584\kappa \cdot 2^{-\mu}$ | $12 \cdot 2048\kappa \cdot 2^{-\mu}$ | 0 | 11 |
| $\overline{A}19$ | $L_{RA}$ | $15 \cdot 2^\mu$ | $4096\kappa \cdot 2^{-\mu}$ | $13 \cdot 2048\kappa \cdot 2^{-\mu}$ | 0 | 12 |
| $\overline{A}20$ | $L_{RA}$ | $15 \cdot 2^\mu$ | $512\kappa \cdot 2^{-\mu}$ | $11 \cdot 2048\kappa \cdot 2^{-\mu}$ | 0 | 9 |
| $\overline{A}21$ | $L_{RA}$ | $15 \cdot 2^\mu$ | $1024\kappa \cdot 2^{-\mu}$ | $12 \cdot 2048\kappa \cdot 2^{-\mu}$ | 0 | 10 |
| $\overline{A}22$ | $L_{RA}$ | $15 \cdot 2^\mu$ | $1536\kappa \cdot 2^{-\mu}$ | $13 \cdot 2048\kappa \cdot 2^{-\mu}$ | 0 | 11 |
| $\overline{A}23$ | $L_{RA}$ | $15 \cdot 2^\mu$ | $2048\kappa \cdot 2^{-\mu}$ | $14 \cdot 2048\kappa \cdot 2^{-\mu}$ | 0 | 12 |

For yet another example of the first PRACH preamble format, $N_{SEQ}^{RA} < N_{symb}^{RA}$. Illustration of example PRACH preamble formats are shown in and example new PRACH preamble formats are shown in FIG. 11, and more examples are shown in TABLE 9, wherein the PRACH preamble sequence length is given by $L_{RA}$, $\Delta f^{RA}$ is the SCS of PRACH preamble, $N_{CP}^{RA}$ is the length of CP in the PRACH preamble format, $N_u$ is the length of sequence(s) in the PRACH preamble format which includes $N_{SEQ}^{RA}$ number of repeated sequences (i.e., $N_{SEQ}^{RA}$ is the integer before $2048\kappa \cdot 2^{-\mu}$), $N_{GAP}^{RA}$ is the length of GAP in the PRACH preamble format, $N_{symb}^{RA}$ is the total number of symbols for the PRACH preamble format, and K is constant equal to 64.

In one example, this example of the first PRACH preamble format can be utilized for the scenario with a larger CP length requirement.

Figure 11:
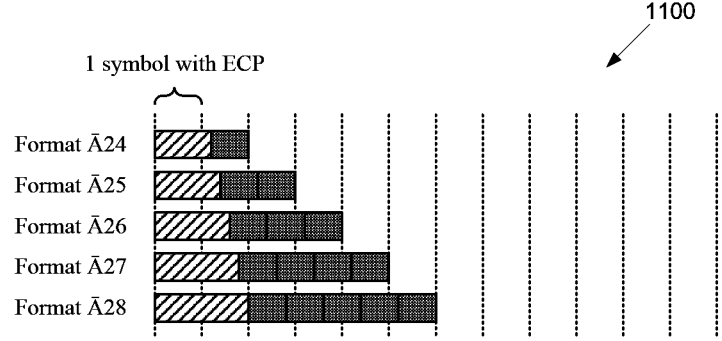
FIG. 11 illustrates yet another example PRACH preamble format for extended CP length according to embodiments of the present disclosure.

FIG. 11 illustrates yet another example PRACH preamble format 1100 for extended CP length according to embodiments of the present disclosure. An embodiment of the PRACH preamble format 1100 shown in FIG. 11 is for illustration only.

TABLE 9

Example first PRACH preamble format for extended CP length.

| Format | $L_{RA}$ | $\Delta f^{RA}$ (kHz) | $N_{CP}^{RA}$ | $N_u(N_{SEQ}^{RA} \cdot 2048\kappa \cdot 2^{-\mu})$ | $N_{GAP}^{RA}$ | $N_{symb}^{RA}$ |
|---|---|---|---|---|---|---|
| $\overline{A}24$ | $L_{RA}$ | $15 \cdot 2^\mu$ | $3072\kappa \cdot 2^{-\mu}$ | $1 \cdot 2048\kappa \cdot 2^{-\mu}$ | 0 | 2 |
| $\overline{A}25$ | $L_{RA}$ | $15 \cdot 2^\mu$ | $3584\kappa \cdot 2^{-\mu}$ | $2 \cdot 2048\kappa \cdot 2^{-\mu}$ | 0 | 3 |
| $\overline{A}26$ | $L_{RA}$ | $15 \cdot 2^\mu$ | $4096\kappa \cdot 2^{-\mu}$ | $3 \cdot 2048\kappa \cdot 2^{-\mu}$ | 0 | 4 |
| $\overline{A}27$ | $L_{RA}$ | $15 \cdot 2^\mu$ | $4608\kappa \cdot 2^{-\mu}$ | $4 \cdot 2048\kappa \cdot 2^{-\mu}$ | 0 | 5 |
| $\overline{A}28$ | $L_{RA}$ | $15 \cdot 2^\mu$ | $5120\kappa \cdot 2^{-\mu}$ | $5 \cdot 2048\kappa \cdot 2^{-\mu}$ | 0 | 6 |
| $\overline{A}29$ | $L_{RA}$ | $15 \cdot 2^\mu$ | $5632\kappa \cdot 2^{-\mu}$ | $6 \cdot 2048\kappa \cdot 2^{-\mu}$ | 0 | 7 |
| $\overline{A}30$ | $L_{RA}$ | $15 \cdot 2^\mu$ | $6144\kappa \cdot 2^{-\mu}$ | $7 \cdot 2048\kappa \cdot 2^{-\mu}$ | 0 | 8 |
| $\overline{A}31$ | $L_{RA}$ | $15 \cdot 2^\mu$ | $6656\kappa \cdot 2^{-\mu}$ | $8 \cdot 2048\kappa \cdot 2^{-\mu}$ | 0 | 9 |
| $\overline{A}32$ | $L_{RA}$ | $15 \cdot 2^\mu$ | $7168\kappa \cdot 2^{-\mu}$ | $9 \cdot 2048\kappa \cdot 2^{-\mu}$ | 0 | 10 |
| $\overline{A}33$ | $L_{RA}$ | $15 \cdot 2^\mu$ | $7680\kappa \cdot 2^{-\mu}$ | $10 \cdot 2048\kappa \cdot 2^{-\mu}$ | 0 | 11 |
| $\overline{A}34$ | $L_{RA}$ | $15 \cdot 2^\mu$ | $8192\kappa \cdot 2^{-\mu}$ | $11 \cdot 2048\kappa \cdot 2^{-\mu}$ | 0 | 12 |

In one example, a second PRACH preamble format can include a duration $N_{CP}^{RA}$ for CP of PRACH preamble, and a following duration $N_u$ for a number $N_{SEQ}^{RA}$ of sequences, wherein the total duration of the CP and sequences is smaller than an integer multiple of symbol durations with extended CP (wherein the integer is denoted as $N_{symb}^{RA}$), and each sequence in the number of sequences has same duration of $2048K \cdot 2^{-\mu}$. The difference between the total duration of the CP and sequences and the integer multiple of symbols durations is left as empty and denoted as $N_{GAP}^{RA}$.

In one example, $N_{CP}^{RA} > N_{GAP}^{RA}$ and $N_{CP}^{RA} - N_{GAP}^{RA}$ corresponds to the maximum delay spread in the cell.

For one example of the second PRACH preamble format, $N_{SEQ}^{RA} = N_{symb}^{RA}$. Illustration of example PRACH preamble formats are shown in and example new PRACH preamble formats are shown in FIG. 12, and more examples are shown in TABLE 10, wherein the PRACH preamble sequence length is given by $L_{RA}$, $\Delta f^{RA}$ is the SCS of PRACH preamble, $N_{CP}^{RA}$ is the length of CP in the PRACH preamble format, $N_u$ is the length of sequence(s) in the PRACH preamble format which includes $N_{SEQ}^{RA}$ number of repeated sequences (i.e., $N_{SEQ}^{RA}$ is the integer before $2048\kappa \cdot 2^{-\mu}$), $N_{GAP}^{RA}$ is the length of GAP in the PRACH preamble format, $N_{symb}^{RA}$ is the total number of symbols for the PRACH preamble format, and K is constant equal to 64.

Figure 12:
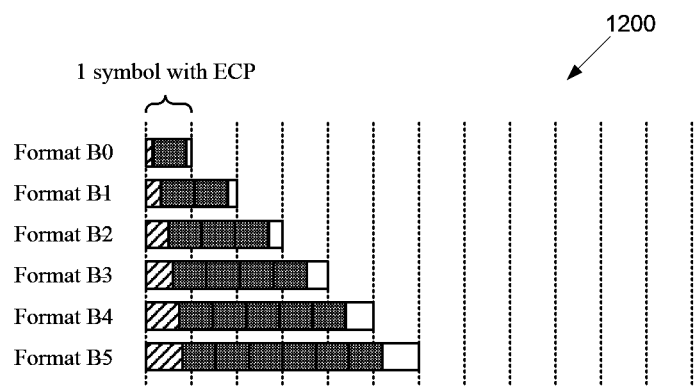
FIG. 12 illustrates yet another example PRACH preamble format for extended CP length according to embodiments of the present disclosure.

FIG. 12 illustrates yet another example PRACH preamble format 1200 for extended CP length according to embodiments of the present disclosure. An embodiment of the PRACH preamble format 1200 shown in FIG. 12 is for illustration only.

TABLE 10

Example second PRACH preamble format for extended CP length.

| Format | $L_{RA}$ | $\Delta f^{RA}$ (kHz) | $N_{CP}^{RA}$ | $N_u(N_{SEQ}^{RA} \cdot 2048\kappa \cdot 2^{-\mu})$ | $N_{GAP}^{RA}$ | $N_{symb}^{RA}$ |
|---|---|---|---|---|---|---|
| $\overline{B}0$ | $L_{RA}$ | $15 \cdot 2^\mu$ | $328\kappa \cdot 2^{-\mu}$ | $1 \cdot 2048\kappa \cdot 2^{-\mu}$ | $184\kappa \cdot 2^{-\mu}$ | 1 |
| $\overline{B}1$ | $L_{RA}$ | $15 \cdot 2^\mu$ | $584\kappa \cdot 2^{-\mu}$ | $2 \cdot 2048\kappa \cdot 2^{-\mu}$ | $440\kappa \cdot 2^{-\mu}$ | 2 |
| $\overline{B}2$ | $L_{RA}$ | $15 \cdot 2^\mu$ | $840\kappa \cdot 2^{-\mu}$ | $3 \cdot 2048\kappa \cdot 2^{-\mu}$ | $696\kappa \cdot 2^{-\mu}$ | 3 |
| $\overline{B}3$ | $L_{RA}$ | $15 \cdot 2^\mu$ | $1096\kappa \cdot 2^{-\mu}$ | $4 \cdot 2048\kappa \cdot 2^{-\mu}$ | $952\kappa \cdot 2^{-\mu}$ | 4 |
| $\overline{B}4$ | $L_{RA}$ | $15 \cdot 2^\mu$ | $1352\kappa \cdot 2^{-\mu}$ | $5 \cdot 2048\kappa \cdot 2^{-\mu}$ | $1208\kappa \cdot 2^{-\mu}$ | 5 |
| $\overline{B}5$ | $L_{RA}$ | $15 \cdot 2^\mu$ | $1608\kappa \cdot 2^{-\mu}$ | $6 \cdot 2048\kappa \cdot 2^{-\mu}$ | $1464\kappa \cdot 2^{-\mu}$ | 6 |
| $\overline{B}6$ | $L_{RA}$ | $15 \cdot 2^\mu$ | $1864\kappa \cdot 2^{-\mu}$ | $7 \cdot 2048\kappa \cdot 2^{-\mu}$ | $1720\kappa \cdot 2^{-\mu}$ | 7 |
| $\overline{B}7$ | $L_{RA}$ | $15 \cdot 2^\mu$ | $2120\kappa \cdot 2^{-\mu}$ | $8 \cdot 2048\kappa \cdot 2^{-\mu}$ | $1976\kappa \cdot 2^{-\mu}$ | 8 |
| $\overline{B}8$ | $L_{RA}$ | $15 \cdot 2^\mu$ | $2376\kappa \cdot 2^{-\mu}$ | $9 \cdot 2048\kappa \cdot 2^{-\mu}$ | $2232\kappa \cdot 2^{-\mu}$ | 9 |
| $\overline{B}9$ | $L_{RA}$ | $15 \cdot 2^\mu$ | $2632\kappa \cdot 2^{-\mu}$ | $10 \cdot 2048\kappa \cdot 2^{-\mu}$ | $2488\kappa \cdot 2^{-\mu}$ | 10 |
| $\overline{B}10$ | $L_{RA}$ | $15 \cdot 2^\mu$ | $2888\kappa \cdot 2^{-\mu}$ | $11 \cdot 2048\kappa \cdot 2^{-\mu}$ | $2744\kappa \cdot 2^{-\mu}$ | 11 |
| $\overline{B}11$ | $L_{RA}$ | $15 \cdot 2^\mu$ | $3144\kappa \cdot 2^{-\mu}$ | $12 \cdot 2048\kappa \cdot 2^{-\mu}$ | $3000\kappa \cdot 2^{-\mu}$ | 12 |

For another example of the second PRACH preamble format, $N_{SEQ}^{RA} > N_{symb}^{RA}$. Illustration of example PRACH preamble formats are shown in and example new PRACH preamble formats are shown in FIG. 13, and more examples are shown in TABLE 11, wherein the PRACH preamble sequence length is given by $L_{RA}$, $\Delta f^{RA}$ is the SCS of PRACH preamble, $N_{CP}^{RA}$ is the length of CP in the PRACH preamble format, $N_u$ is the length of sequence(s) in the PRACH preamble format which includes $N_{SEQ}^{RA}$ number of repeated sequences (i.e., $N_{SEQ}^{RA}$ is the integer before $2048\kappa \cdot 2^{-\mu}$), $N_{GAP}^{RA}$ is the length of GAP in the PRACH preamble format, $N_{symb}^{RA}$ is the total number of symbols for the PRACH preamble format, and K is constant equal to 64.

Figure 13:
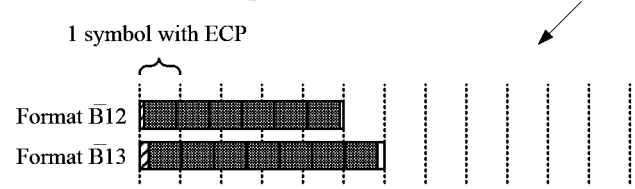
FIG. 13 illustrates yet another example PRACH preamble format for extended CP length according to embodiments of the present disclosure.

FIG. 13 illustrates yet another example PRACH preamble format 1300 for extended CP length according to embodiments of the present disclosure. An embodiment of the PRACH preamble format 1300 shown in FIG. 13 is for illustration only.

TABLE 11

Example second PRACH preamble format for extended CP length

| Format | $L_{RA}$ | $\Delta f^{RA}$ (kHz) | $N_{CP}^{RA}$ | $N_u(N_{SEQ}^{RA} \cdot 2048\kappa \cdot 2^{-\mu})$ | $N_{GAP}^{RA}$ | $N_{symb}^{RA}$ |
|---|---|---|---|---|---|---|
| $\overline{B}12$ | $L_{RA}$ | $15 \cdot 2^\mu$ | $328\kappa \cdot 2^{-\mu}$ | $6 \cdot 2048\kappa \cdot 2^{-\mu}$ | $184\kappa \cdot 2^{-\mu}$ | 5 |
| $\overline{B}13$ | $L_{RA}$ | $15 \cdot 2^\mu$ | $584\kappa \cdot 2^{-\mu}$ | $7 \cdot 2048\kappa \cdot 2^{-\mu}$ | $440\kappa \cdot 2^{-\mu}$ | 6 |
| $\overline{B}14$ | $L_{RA}$ | $15 \cdot 2^\mu$ | $840\kappa \cdot 2^{-\mu}$ | $8 \cdot 2048\kappa \cdot 2^{-\mu}$ | $696\kappa \cdot 2^{-\mu}$ | 7 |
| $\overline{B}15$ | $L_{RA}$ | $15 \cdot 2^\mu$ | $1096\kappa \cdot 2^{-\mu}$ | $9 \cdot 2048\kappa \cdot 2^{-\mu}$ | $952\kappa \cdot 2^{-\mu}$ | 8 |
| $\overline{B}16$ | $L_{RA}$ | $15 \cdot 2^\mu$ | $1352\kappa \cdot 2^{-\mu}$ | $10 \cdot 2048\kappa \cdot 2^{-\mu}$ | $1208\kappa \cdot 2^{-\mu}$ | 9 |
| $\overline{B}17$ | $L_{RA}$ | $15 \cdot 2^\mu$ | $1608\kappa \cdot 2^{-\mu}$ | $11 \cdot 2048\kappa \cdot 2^{-\mu}$ | $1464\kappa \cdot 2^{-\mu}$ | 10 |
| $\overline{B}18$ | $L_{RA}$ | $15 \cdot 2^\mu$ | $1864\kappa \cdot 2^{-\mu}$ | $12 \cdot 2048\kappa \cdot 2^{-\mu}$ | $1720\kappa \cdot 2^{-\mu}$ | 11 |
| $\overline{B}19$ | $L_{RA}$ | $15 \cdot 2^\mu$ | $2120\kappa \cdot 2^{-\mu}$ | $13 \cdot 2048\kappa \cdot 2^{-\mu}$ | $1976\kappa \cdot 2^{-\mu}$ | 12 |
| $\overline{B}20$ | $L_{RA}$ | $15 \cdot 2^\mu$ | $328\kappa \cdot 2^{-\mu}$ | $11 \cdot 2048\kappa \cdot 2^{-\mu}$ | $184\kappa \cdot 2^{-\mu}$ | 9 |
| $\overline{B}21$ | $L_{RA}$ | $15 \cdot 2^\mu$ | $584\kappa \cdot 2^{-\mu}$ | $12 \cdot 2048\kappa \cdot 2^{-\mu}$ | $440\kappa \cdot 2^{-\mu}$ | 10 |
| $\overline{B}22$ | $L_{RA}$ | $15 \cdot 2^\mu$ | $840\kappa \cdot 2^{-\mu}$ | $13 \cdot 2048\kappa \cdot 2^{-\mu}$ | $696\kappa \cdot 2^{-\mu}$ | 11 |
| $\overline{B}23$ | $L_{RA}$ | $15 \cdot 2^\mu$ | $1096\kappa \cdot 2^{-\mu}$ | $14 \cdot 2048\kappa \cdot 2^{-\mu}$ | $952\kappa \cdot 2^{-\mu}$ | 12 |

For yet another example of the second PRACH preamble format, $N_{SEQ}^{RA} < N_{symb}^{RA}$. Illustration of example PRACH preamble formats are shown in and example new PRACH preamble formats are shown in FIG. 14, and more examples are shown in TABLE 12, wherein the PRACH preamble sequence length is given by $L_{RA}$, $\Delta f^{RA}$ is the SCS of PRACH preamble, $N_{CP}^{RA}$ is the length of CP in the PRACH preamble format, $N_u$ is the length of sequence(s) in the PRACH preamble format which includes $N_{SEQ}^{RA}$ number of repeated sequences (i.e., $N_{SEQ}^{RA}$ is the integer before $2048\kappa \cdot 2^{-\mu}$), $N_{GAP}^{RA}$ is the length of GAP in the PRACH preamble format, $N_{symb}^{RA}$ is the total number of symbols for the PRACH preamble format, and K is constant equal to 64.

Figure 14:
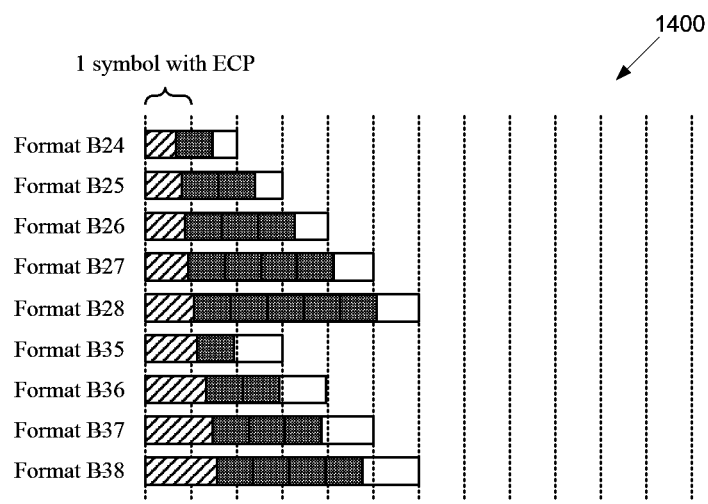
FIG. 14 illustrates yet another example PRACH preamble format for extended CP length according to embodiments of the present disclosure.

FIG. 14 illustrates yet another example PRACH preamble format 1400 for extended CP length according to embodiments of the present disclosure. An embodiment of the PRACH preamble format 1400 shown in FIG. 14 is for illustration only.

preamble may be $L_{RA}$=1583 when the number of resource blocks is 132, $L_{RA}$=2011 when the number of resource blocks is 168, or $L_{RA}$=2087 when the number of resource blocks is 174. In some embodiments, the UE may further determine, from the set of higher layer parameters, a logical root index (i) for the PRACH preamble and determine a sequence number (u) for the PRACH preamble based on the logical root index (i). For example, the sequence number (u) may be determined according to u=i/2−1, if i is even, and u=$L_{RA}$−1−(i−1)/2, if i is odd. Here, $L_{RA}$ is a sequence length for the PRACH preamble and i∈{0, 1, . . . , $L_{RA}$−2}.

The UE then determines a PRACH preamble format (step 1503). For example, in step 1503, the UE may determine the PRACH preamble format from the set of higher layer parameters, and the PRACH preamble format may be based on OFDM symbols with the extended CP length. In some embodiments, the PRACH preamble format is a first type of PRACH preamble format or a second type of PRACH

TABLE 12

Example second PRACH preamble format for extended CP length

| Format | $L_{RA}$ | $\Delta f^{RA}$ (kHz) | $N_{CP}^{RA}$ | $N_u(N_{SEQ}^{RA} \cdot 2048\kappa \cdot 2^{-\mu})$ | $N_{GAP}^{RA}$ | $N_{symb}^{RA}$ |
|---|---|---|---|---|---|---|
| B24 | $L_{RA}$ | 15 · $2^\mu$ | 1608κ · $2^{-\mu}$ | 1 · 2048κ · $2^{-\mu}$ | 1464κ · $2^{-\mu}$ | 2 |
| B25 | $L_{RA}$ | 15 · $2^\mu$ | 1864κ · $2^{-\mu}$ | 2 · 2048κ · $2^{-\mu}$ | 1720κ · $2^{-\mu}$ | 3 |
| B26 | $L_{RA}$ | 15 · $2^\mu$ | 2120κ · $2^{-\mu}$ | 3 · 2048κ · $2^{-\mu}$ | 1976κ · $2^{-\mu}$ | 4 |
| B27 | $L_{RA}$ | 15 · $2^\mu$ | 2376κ · $2^{-\mu}$ | 4 · 2048κ · $2^{-\mu}$ | 2232κ · $2^{-\mu}$ | 5 |
| B28 | $L_{RA}$ | 15 · $2^\mu$ | 2632κ · $2^{-\mu}$ | 5 · 2048κ · $2^{-\mu}$ | 2488κ · $2^{-\mu}$ | 6 |
| B29 | $L_{RA}$ | 15 · $2^\mu$ | 2888κ · $2^{-\mu}$ | 6 · 2048κ · $2^{-\mu}$ | 2744κ · $2^{-\mu}$ | 7 |
| B30 | $L_{RA}$ | 15 · $2^\mu$ | 3144κ · $2^{-\mu}$ | 7 · 2048κ · $2^{-\mu}$ | 3000κ · $2^{-\mu}$ | 8 |
| B31 | $L_{RA}$ | 15 · $2^\mu$ | 3400κ · $2^{-\mu}$ | 8 · 2048κ · $2^{-\mu}$ | 3256κ · $2^{-\mu}$ | 9 |
| B32 | $L_{RA}$ | 15 · $2^\mu$ | 3656κ · $2^{-\mu}$ | 9 · 2048κ · $2^{-\mu}$ | 3512κ · $2^{-\mu}$ | 10 |
| B33 | $L_{RA}$ | 15 · $2^\mu$ | 3912κ · $2^{-\mu}$ | 10 · 2048κ · $2^{-\mu}$ | 3768κ · $2^{-\mu}$ | 11 |
| B34 | $L_{RA}$ | 15 · $2^\mu$ | 4168κ · $2^{-\mu}$ | 11 · 2048κ · $2^{-\mu}$ | 4024κ · $2^{-\mu}$ | 12 |
| B35 | $L_{RA}$ | 15 · $2^\mu$ | 2888κ · $2^{-\mu}$ | 1 · 2048κ · $2^{-\mu}$ | 2744κ · $2^{-\mu}$ | 3 |
| B36 | $L_{RA}$ | 15 · $2^\mu$ | 3144κ · $2^{-\mu}$ | 2 · 2048κ · $2^{-\mu}$ | 3000κ · $2^{-\mu}$ | 4 |
| B37 | $L_{RA}$ | 15 · $2^\mu$ | 3400κ · $2^{-\mu}$ | 3 · 2048κ · $2^{-\mu}$ | 3256κ · $2^{-\mu}$ | 5 |
| B38 | $L_{RA}$ | 15 · $2^\mu$ | 3656κ · $2^{-\mu}$ | 4 · 2048κ · $2^{-\mu}$ | 3512κ · $2^{-\mu}$ | 6 |
| B39 | $L_{RA}$ | 15 · $2^\mu$ | 3912κ · $2^{-\mu}$ | 5 · 2048κ · $2^{-\mu}$ | 3768κ · $2^{-\mu}$ | 7 |
| B40 | $L_{RA}$ | 15 · $2^\mu$ | 4168κ · $2^{-\mu}$ | 6 · 2048κ · $2^{-\mu}$ | 4024κ · $2^{-\mu}$ | 8 |
| B41 | $L_{RA}$ | 15 · $2^\mu$ | 4424κ · $2^{-\mu}$ | 7 · 2048κ · $2^{-\mu}$ | 4280κ · $2^{-\mu}$ | 9 |
| B42 | $L_{RA}$ | 15 · $2^\mu$ | 4680κ · $2^{-\mu}$ | 8 · 2048κ · $2^{-\mu}$ | 4536κ · $2^{-\mu}$ | 10 |
| B43 | $L_{RA}$ | 15 · $2^\mu$ | 4936κ · $2^{-\mu}$ | 9 · 2048κ · $2^{-\mu}$ | 4792κ · $2^{-\mu}$ | 11 |
| B44 | $L_{RA}$ | 15 · $2^\mu$ | 5192κ · $2^{-\mu}$ | 10 · 2048κ · $2^{-\mu}$ | 5048κ · $2^{-\mu}$ | 12 |

Figure 15:
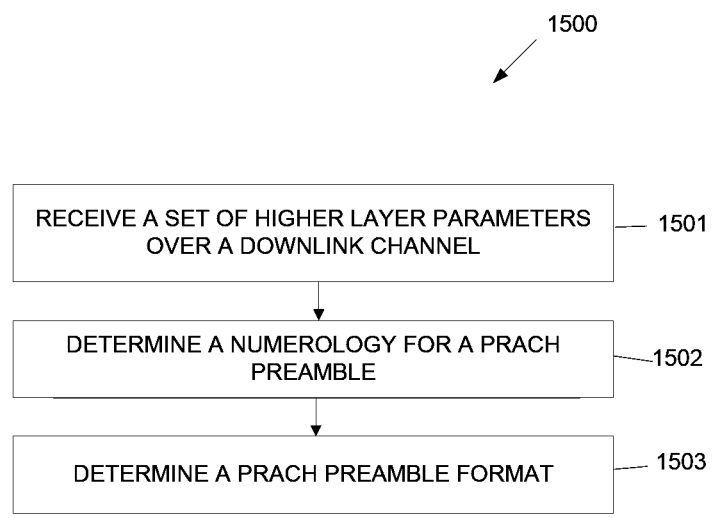
FIG. 15 illustrates a flowchart of a method for determining a numerology of a PRACH preamble and a PRACH preamble format according to embodiments of the present disclosure.

FIG. 15 illustrates a flowchart of a method 1500 for determining parameters for a PRACH preamble based on higher layer signaling according to embodiments of the present disclosure. For example, the method 1500 may be performed by the UE 116 and a corresponding method may be performed by the gNB 102. An embodiment of the method 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

The method begins with the UE receiving a set of higher layer parameters over a downlink channel (step 1501).

Thereafter, the UE determines a numerology for a PRACH preamble (step 1502). For example, in step 1502, the UE may determine the numerology from the set of higher layer parameters, and the numerology may include an extended CP length. In some embodiments, the UE may also determine, from the set of higher layer parameters, a sequence length ($L_{RA}$) for the PRACH preamble. The sequence length equals a largest prime number smaller than a number of subcarriers within a number of resource blocks. For example, the sequence length ($L_{RA}$) for the PRACH preamble format. If a first type of PRACH preamble format, the first type of PRACH preamble format includes a first duration ($N_{CP}^{RA}$) for cyclic prefix of the PRACH preamble and a second duration ($N_u$) for a number ($N_{SEQ}^{RA}$) of sequences. Also, a total duration of the first and second durations equals a number ($N_{symb}^{RA}$) of OFDM symbols with extended CP length. If the PRACH preamble format is the second type of PRACH preamble format, the second type of PRACH preamble format includes a first duration ($N_{CP}^{RA}$) for cyclic prefix of the PRACH preamble and a second duration ($N_u$) for a number ($N_{SEQ}^{RA}$) of sequences. Also, a total duration of the first and second durations is smaller than a number ($N_{symb}^{RA}$) of OFDM symbols with extended CP length. In these embodiments, $N_{SEQ}^{RA} = N_{symb}^{RA}$ for the first type of PRACH preamble format and $N_{SEQ}^{RA} = N_{symb}^{RA}$ or $N_{SEQ}^{RA} \leq N_{symb}^{RA}$ for the second type of PRACH preamble format. In some embodiments, the UE may further determine from the set of higher layer parameters, a value (zeroCorrelationZoneConfig) and determine a cyclic shift ($N_{CS}$) based on the value (zeroCorrelationZoneConfig).

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A base station (BS) in a wireless communication system, the BS comprising:
a processor configured to:
determine a numerology for a physical random access channel (PRACH) preamble, wherein the numerology includes an extended cyclic prefix (CP) length; and
determine a PRACH preamble format, wherein the PRACH preamble format is based on orthogonal frequency division multiplexing (OFDM) symbols with the extended CP length; and
a transceiver operably connected to the processor, the transceiver configured to transmit a set of higher layer parameters including the numerology for the PRACH preamble and the PRACH preamble format over a downlink channel, wherein one of:
(i) the PRACH preamble format is a first type of PRACH preamble format where:
the first type of PRACH preamble format includes a first duration ($N_{CP}^{RA}$) for a cyclic prefix of the PRACH preamble and a second duration ($N_u$) for a number ($N_{SEQ}^{RA}$) of sequences, and
a total duration of the first and second durations equals a number ($N_{symb}^{RA}$) of OFDM symbols with extended CP length, or
(ii) the PRACH preamble format is a second type of PRACH preamble format where:
the second type of PRACH preamble format includes a first duration ($N_{CP}^{RA}$) for a cyclic prefix of the PRACH preamble and a second duration ($N_u$) for a number ($N_{SEQ}^{RA}$) of sequences, and
a total duration of the first and second durations is smaller than a number ($N_{symb}^{RA}$) of OFDM symbols with extended CP length.

2. The BS of claim 1, wherein:
$N_{SEQ}^{RA}=N_{symb}^{RA}$ for the first type of PRACH preamble format; and
$N_{SEQ}^{RA}=N_{symb}^{RA}$ or $N_{SEQ}^{RA} \leq N_{symb}^{RA}$ for the second type of PRACH preamble format.

3. The BS of claim 1, wherein:
the processor is further configured to determine a sequence length ($L_{RA}$) for the PRACH preamble, wherein the sequence length equals a largest prime number smaller than a number of subcarriers within a number of resource blocks, and
the transmitted set of higher layer parameters further includes the sequence length ($L_{RA}$) for the PRACH preamble.

4. The BS of claim 3, wherein the sequence length ($L_{RA}$) for the PRACH preamble is:
$L_{RA}=1583$, when the number of resource blocks is 132,
$L_{RA}=2011$, when the number of resource blocks is 168, or
$L_{RA}=2087$, when the number of resource blocks is 174.

5. The BS of claim 1, wherein the processor is further configured to:
determine a logical root index (i) for the PRACH preamble; and
determine a sequence number (u) for the PRACH preamble based on the logical root index (i) according to:
u=i/2−1, if i is even, and
u=$L_{RA}$−1−(i−1)/2, if i is odd,
wherein $L_{RA}$ is a sequence length for the PRACH preamble and i ∈ {0, 1, . . . , $L_{RA}$−2}, and
wherein the transmitted set of higher layer parameters further includes the logical root index (i).

6. The BS of claim 1, wherein the processor is further configured to:
determine a value (zeroCorrelationZoneConfig); and
determine a cyclic shift ($N_{CS}$) based on the value (zeroCorrelationZoneConfig),
wherein the transmitted set of higher layer parameters further includes the value (zeroCorrelationZoneConfig).

7. A user equipment (UE) in a wireless communication system, the UE comprising:
a transceiver configured to receive a set of higher layer parameters over a downlink channel; and
a processor operably connected to the transceiver, the processor configured to:
determine, from the set of higher layer parameters, a numerology for a physical random access channel (PRACH) preamble, wherein the numerology includes an extended cyclic prefix (CP) length; and
determine, from the set of higher layer parameters, a PRACH preamble format, wherein the PRACH preamble format is based on orthogonal frequency division multiplexing (OFDM) symbols with the extended CP length, wherein one of:
(i) the PRACH preamble format is a first type of PRACH preamble format where:
the first type of PRACH preamble format includes a first duration ($N_{CP}^{RA}$) for a cyclic prefix of the PRACH preamble and a second duration ($N_u$) for a number ($N_{SEQ}^{RA}$) of sequences, and
a total duration of the first and second durations equals a number ($N_{symb}^{RA}$) of OFDM symbols with extended CP length, or
(ii) the PRACH preamble format is a second type of PRACH preamble format where:
the second type of PRACH preamble format includes a first duration ($N_{CP}^{RA}$) for a cyclic prefix of the PRACH preamble and a second duration (N) for a number ($N_{SEQ}^{RA}$) of sequences, and
a total duration of the first and second durations is smaller than a number ($N_{symb}^{RA}$) of OFDM symbols with extended CP length.

8. The UE of claim 7, wherein:
$N_{SEQ}^{RA}=N_{symb}^{RA}$ for the first type of PRACH preamble format; and
$N_{SEQ}^{RA}=N_{symb}^{RA}$ or $N_{SEQ}^{RA} \leq N_{symb}^{RA}$ for the second type of PRACH preamble format.

9. The UE of claim 7, wherein the processor is further configured to determine, from the set of higher layer parameters, a sequence length ($L_{RA}$) for the PRACH preamble, wherein the sequence length equals a largest prime number smaller than a number of subcarriers within a number of resource blocks.

10. The UE of claim 9, wherein the sequence length ($L_{RA}$) for the PRACH preamble is:
$L_{RA}$=1583, when the number of resource blocks is 132,
$L_{RA}$=2011, when the number of resource blocks is 168, or
$L_{RA}$=2087, when the number of resource blocks is 174.

11. The UE of claim 7, wherein the processor is further configured to:
determine, from the set of higher layer parameters, a logical root index (i) for the PRACH preamble; and
determine a sequence number (u) for the PRACH preamble based on the logical root index (i) according to:
u=i/2−1, if i is even, and
u=$L_{RA}$−1−(i−1)/2, if i is odd,
wherein L is a sequence length for the PRACH preamble and i ∈ {0, 1, . . . , $L_{RA}$ −2}.

12. The UE of claim 7, wherein the processor is further configured to:
determine, from the set of higher layer parameters, a value (zeroCorrelationZoneConfig); and
determine a cyclic shift ($N_{CS}$) based on the value (zero-CorrelationZoneConfig).

13. A method of a user equipment (UE) in a wireless communication system, the method comprising:
receiving a set of higher layer parameters over a downlink channel;
determining, from the set of higher layer parameters, a numerology for a physical random access channel (PRACH) preamble, wherein the numerology includes an extended cyclic prefix (CP) length; and
determining, from the set of higher layer parameters, a PRACH preamble format, wherein the PRACH preamble format is based on orthogonal frequency division multiplexing (OFDM) symbols with the extended CP length, wherein one of:
(i) the PRACH preamble format is a first type of PRACH preamble format where:
the first type of PRACH preamble format includes a first duration ($N_{CP}^{RA}$) fora cyclic prefix of the PRACH preamble and a second duration ($N_u$) for a number ($N_{SEQ}^{RA}$) of sequences, and
a total duration of the first and second durations equals a number ($N_{symb}^{RA}$) of OFDM symbols with extended CP length; or
(ii) the PRACH preamble format is a second type of PRACH preamble format where:
the second type of PRACH preamble format includes a first duration ($N_{CP}^{RA}$) for a cyclic prefix of the PRACH preamble and a second duration ($N_u$) for a number ($N_{SEQ}^{RA}$) of sequences, and
a total duration of the first and second durations is smaller than a number ($N_{symb}^{RA}$) of OFDM symbols with extended CP length.

14. The method of claim 13, wherein:
$N_{SEQ}^{RA}$=$N_{symb}^{RA}$ for the first type of PRACH preamble format; and
$N_{SEQ}^{RA}$=$N_{symb}^{RA}$ or $N_{SEQ}^{RA}$≤$N_{symb}^{RA}$ for the second type of PRACH preamble format.

15. The method of claim 13, further comprising:
determining, from the set of higher layer parameters, a sequence length ($L_{RA}$) for the PRACH preamble,
wherein the sequence length equals a largest prime number smaller than a number of subcarriers within a number of resource blocks, and
wherein:
$L_{RA}$=1583, when the number of resource blocks is 132,
$L_{RA}$=2011, when the number of resource blocks is 168, or
$L_{RA}$=2087, when the number of resource blocks is 174.

16. The method of claim 13, further comprising:
determining, from the set of higher layer parameters, a logical root index (i) for the PRACH preamble; and
determining a sequence number (u) for the PRACH preamble based on the logical root index (i) according to:
u=i/2−1, if i is even, and
u=$L_{RA}$−1−(i−1)/2, if i is odd,
wherein $L_{RA}$ is a sequence length for the PRACH preamble and i ∈ {0, 1, . . . , $L_{RA}$−2}.

17. The method of claim 13, further comprising:
determining, from the set of higher layer parameters, a value (zeroCorrelationZoneConfig); and
determining a cyclic shift ($N_{CS}$) based on the value (zeroCorrelationZoneConfig).

* * * * *